US012604032B2

(12) United States Patent
Misra et al.

(10) Patent No.: US 12,604,032 B2
(45) Date of Patent: Apr. 14, 2026

(54) SYSTEMS AND METHODS FOR PERFORMING PADDING IN CODING OF A MULTI-DIMENSIONAL DATA SET

(71) Applicant: Sharp Kabushiki Kaisha, Sakai (JP)

(72) Inventors: Kiran Mukesh Misra, Vancouver, WA (US); Tianying Ji, Vancouver, WA (US); Christopher Andrew Segall, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/617,980

(22) Filed: Mar. 27, 2024

(65) Prior Publication Data

US 2024/0267557 A1 Aug. 8, 2024

Related U.S. Application Data

(63) Continuation of application No. 17/701,966, filed on Mar. 23, 2022, now Pat. No. 11,973,976.

(60) Provisional application No. 63/167,008, filed on Mar. 27, 2021, provisional application No. 63/166,940, filed on Mar. 26, 2021.

(51) Int. Cl.
| | |
|---|---|
| *H04N 19/563* | (2014.01) |
| *G06T 9/00* | (2006.01) |
| *H04N 19/11* | (2014.01) |
| *H04N 19/59* | (2014.01) |

(52) U.S. Cl.
CPC ........... *H04N 19/563* (2014.11); *G06T 9/002* (2013.01); *H04N 19/11* (2014.11); *H04N 19/59* (2014.11)

(58) Field of Classification Search
CPC ...... H04N 19/563; H04N 19/11; H04N 19/59; H04N 19/132; H04N 19/176; H04N 19/18; H04N 19/122
See application file for complete search history.

(56) References Cited

U.S. PATENT DOCUMENTS

| | | | |
|---|---|---|---|
| 2021/0150680 A1* | 5/2021 | Gadgil | G06T 5/40 |
| 2022/0038737 A1* | 2/2022 | He | H04N 19/119 |
| 2022/0222318 A1* | 7/2022 | Garegrat | G06N 3/063 |
| 2022/0277491 A1* | 9/2022 | Lee | G06T 9/002 |

OTHER PUBLICATIONS

Misra et al., "Systems and Methods for Performing Padding in Coding of a Multi-Dimensional Data Set", U.S. Appl. No. 17/701,966, filed Mar. 23, 2022.

* cited by examiner

*Primary Examiner* — Richard T Torrente
(74) *Attorney, Agent, or Firm* — Keating & Bennett, LLP

(57) ABSTRACT

A method of encoding data includes: receiving an input data set having an arbitrary size about a height dimension and a width dimension; padding the input data set according to a padding function selected from a set of padding functions, such that a data set having a desired size about the height dimension and the width dimension is obtained; generating an output data set by performing a discrete convolution on the obtained data set; and generating a signal providing information corresponding to the output data set and the selected padding function.

3 Claims, 16 Drawing Sheets

Input Data

| 107 | 103 | 101 | 98 |
|-----|-----|-----|-----|
| 111 | 108 | 104 | 100 |
| 118 | 113 | 108 | 101 |
| 119 | 109 | 109 | 104 |

$w_i = 4, h_i = 4$

Pad$_{Type1}$

| 107 | 107 | 103 | 101 | 98 | 98 |
|-----|-----|-----|-----|-----|-----|
| 107 | 107 | 103 | 101 | 98 | 98 |
| 111 | 111 | 108 | 104 | 100 | 100 |
| 118 | 118 | 113 | 108 | 101 | 101 |
| 119 | 119 | 109 | 109 | 104 | 104 |
| 119 | 119 | 109 | 109 | 104 | 104 |

$w_1 = 6, h_1 = 6$

Pad$_{Type2}$

| 107 | 107 | 103 | 101 | 98 | 98 |
|-----|-----|-----|-----|-----|-----|
| 107 | 107 | 107 | 103 | 101 | 98 |
| 107 | 107 | 107 | 103 | 101 | 98 |
| 111 | 111 | 111 | 108 | 104 | 100 |
| 118 | 118 | 118 | 113 | 108 | 101 |
| 119 | 119 | 119 | 109 | 109 | 104 |

$w_1 = 6, h_1 = 6$

Pad$_{Type3}$

| 107 | 103 | 101 | 98 | 98 | 98 |
|-----|-----|-----|-----|-----|-----|
| 111 | 108 | 104 | 100 | 100 | 100 |
| 118 | 113 | 108 | 101 | 101 | 101 |
| 119 | 109 | 109 | 104 | 104 | 104 |
| 119 | 109 | 109 | 104 | 104 | 104 |
| 119 | 109 | 109 | 104 | 104 | 104 |

$w_1 = 6, h_1 = 6$

Pad$_{Type4}$

| 107 | 103 | 101 | 98 | 98 | 98 |
|-----|-----|-----|-----|-----|-----|
| 107 | 103 | 101 | 98 | 98 | 98 |
| 111 | 108 | 104 | 100 | 100 | 100 |
| 118 | 113 | 108 | 101 | 101 | 101 |
| 119 | 109 | 109 | 104 | 104 | 104 |
| 119 | 109 | 109 | 104 | 104 | 104 |

$w_1 = 6, h_1 = 6$

SYSTEMS AND METHODS FOR PERFORMING PADDING IN CODING OF A MULTI-DIMENSIONAL DATA SET

CROSS-REFERENCE TO RELATED APPLICATION

The present application claims priority from Provisional Application Nos. 63/166,940 and 63/167,008, the contents of which are hereby incorporated by reference into this application.

TECHNICAL FIELD

This disclosure relates to coding multi-dimensional data and more particularly to techniques for performing padding.

BACKGROUND

Digital video and audio capabilities can be incorporated into a wide range of devices, including digital televisions, computers, digital recording devices, digital media players, video gaming devices, smartphones, medical imaging devices, surveillance systems, tracking and monitoring systems, and the like. Digital video and audio can be represented as a set of arrays. Data represented as a set of arrays may be referred to as multi-dimensional data. For example, a picture in digital video can be represented as a set of two-dimensional arrays of sample values. That is, for example, a video resolution provides a width and height dimension of an array of sample values and each component of a color space provides a number of two-dimensional arrays in the set. Further, the number of pictures in a sequence of digital video provides another dimension of data. For example, one second of 60 Hz video at 1080p resolution having three color components could correspond to four dimensions of data values, i.e., the number of samples may be represented as follows: 1920×1080×3×60. Thus, digital video is an example of multi-dimensional data. It should be noted that digital video may be represented using additional and/or alternative dimensions (e.g., number of layers, number of views/channels, etc.).

Digital video may be coded according to a video coding standard. Video coding standards define the format of a compliant bitstream encapsulating coded video data. A compliant bitstream is a data structure that may be received and decoded by a video decoding device to generate reconstructed video data. Typically, the reconstructed video data is intended for human-consumption (i.e., viewing on a display). Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. The ITU-T Video Coding Experts Group (VCEG) and ISO/IEC (Moving Picture Experts Group (MPEG) (collectively referred to as the Joint Video Exploration Team (JVET)) have worked to standardized video coding technology with a compression capability that exceeds that of HEVC. This standardization effort is referred to as the Versatile Video Coding (VVC) project. "Versatile Video Coding (Draft 10)," 20th Meeting of ISO/IEC JTC1/SC29/ WG11 7-16 Oct. 2020, Teleconference, document JVET-T2001-v2, which is incorporated by reference herein, and referred to as VVC, represents the current iteration of the draft text of a video coding specification corresponding to the VVC project.

Video coding standards may utilize video compression techniques. Video compression techniques reduce data requirements for storing and/or transmitting video data by exploiting the inherent redundancies in a video sequence. Video compression techniques typically sub-divide a video sequence into successively smaller portions (i.e., groups of pictures within a video sequence, a picture within a group of pictures, regions within a picture, sub-regions within regions, etc.) and utilize intra prediction coding techniques (e.g., spatial prediction techniques within a picture) and inter prediction techniques (i.e., inter-picture techniques (temporal)) to generate difference values between a unit of video data to be coded and a reference unit of video data. The difference values may be referred to as residual data. Syntax elements may relate residual data and a reference coding unit (e.g., intra-prediction mode indices and motion information). Residual data and syntax elements may be entropy coded. Entropy encoded residual data and syntax elements may be included in data structures forming a compliant bitstream.

SUMMARY

In general, this disclosure describes various techniques for coding multi-dimensional data, which may be referred to as a multi-dimensional data set (MDDS) and may include, for example, video data, audio data, and the like. It should be noted that in addition to reducing the data requirements for providing multi-dimensional data for human consumption, the techniques for coding of multi-dimensional data described herein may be useful for other applications. For example, the techniques described herein may be useful for so-called machine consumption. That is, for example, in the case of surveillance, it may be useful for a monitoring application running on a central server to be able quickly identify and track an object from any of a number video feeds. In this case, it is not necessary that the coded video data is capable of being reconstructed to a human consumable form, but only capable of being able to allow an object to be identified. This disclosure, in particular, describes techniques for performing padding. The techniques described in this disclosure may be particularly useful for retaining a size of a particular data set. It should be noted that as used herein the term typical video coding standard or typical video coding may refer to a video coding standard utilizing one or more of the following video compression techniques: video partitioning techniques, intra prediction techniques, inter prediction techniques, residual transform techniques, reconstructed video filtering techniques, and/or entropy coding techniques for residual data and syntax elements. For example, the term typical video coding standard may refer to any of ITU-T H.264, ITU-T H.265, VVC, and the like, individually or collectively. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of encoding data comprises: receiving an input data set having an arbitrary size about a height dimension and a width dimension; padding the input data set according to a padding function selected from a set of padding functions, such that a data set having a desired size about the height dimension and the width dimension is obtained; generating an output data set by performing a discrete convolution on the obtained data set; and generating a signal providing information corresponding to the output data set and the selected padding function.

In one example, a device comprises one or more processors configured to: receive an input data set having an arbitrary size about a height dimension and a width dimension; pad the input data set according to a padding function selected from a set of padding functions, such that a data set having a desired size about the height dimension and the width dimension is obtained; generate an output data set by performing a discrete convolution on the obtained data set; and generate a signal providing information corresponding to the output data set and the selected padding function.

In one example, a method of decoding video data comprises: receiving an output data set; receiving a signal providing information corresponding to a padding function selected from a set of padding functions; generating an intermediate data set by performing a discrete convolution transpose on the received output data set; and generating a reconstructed data set corresponding to an input data set having an arbitrary size by performing a cropping function on the generated intermediate data set, wherein the cropping function corresponds to the selected padding function.

The details of one or more examples are set forth in the accompanying drawings and the description below. Other features, objects, and advantages will be apparent from the description and drawings, and from the claims.

DETAILED DESCRIPTION

Video content includes video sequences comprised of a series of frames (or pictures). A series of frames may also be referred to as a group of pictures (GOP). For coding purposes, each video frame or picture may divided into one or more regions, which may be referred to as video blocks. As used herein, the term video block may generally refer to an area of a picture that may be coded (e.g., according to a prediction technique), sub-divisions thereof, and/or corresponding structures. Further, the term current video block may refer to an area of a picture presently being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components (RGB)). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

Figure 1:
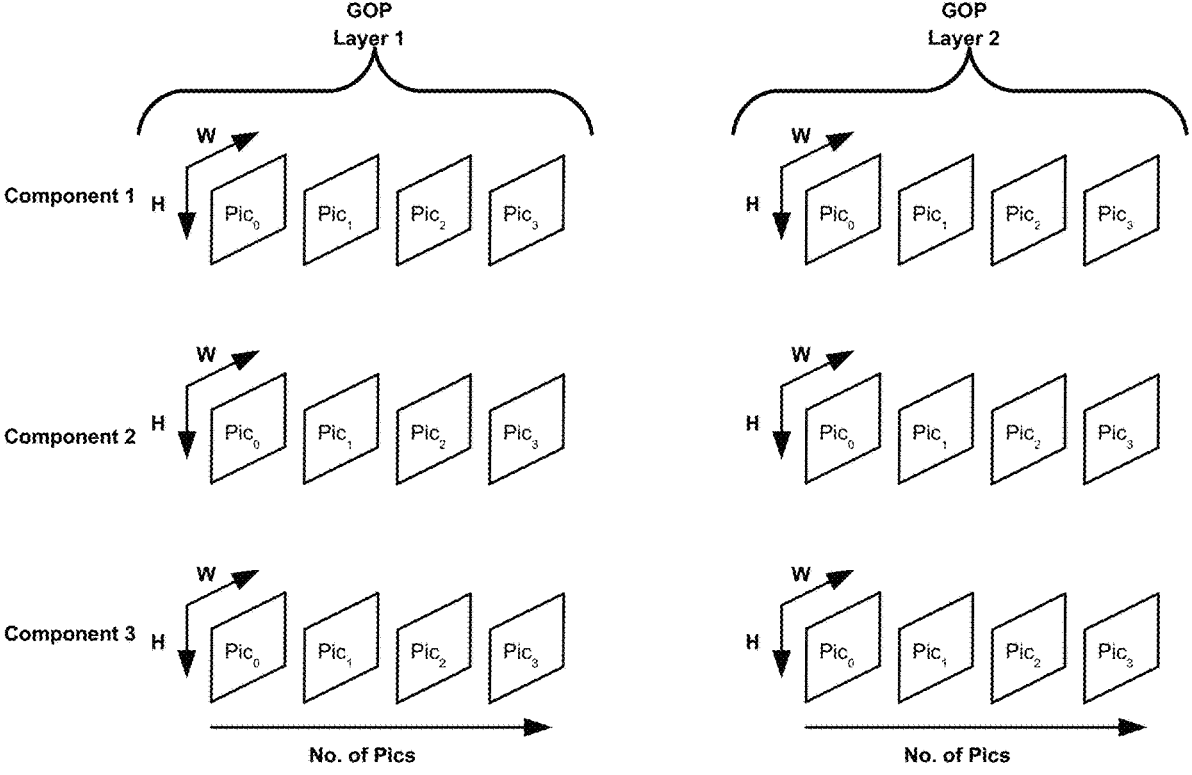
FIG. 1 is a conceptual diagram illustrating video data as a multi-dimensional data set (MDDS) in accordance with one more techniques of this disclosure.

Digital video data including one or more video sequences is an example of multi-dimensional data. FIG. 1 is a conceptual diagram illustrating video data represented as multi-dimensional data. Referring to FIG. 1, the video data includes a respective group of pictures for two layers. For example, each layer may be a view (e.g., a left and a right view) or a temporal layer of video. As illustrated in FIG. 1, each layer includes three components of video data (e.g., RGB, YCbCr, etc.) and each component includes four pictures having width (W)×height (H) sample values (e.g., 1920×1080, 1280×720, etc.). Thus, in the example illustrated in FIG. 1, there are 24 W×H arrays of sample values and each array of sample values may be described as a two-dimensional data. Further, the arrays may be grouped into sets according to one or more other dimensions (e.g., channels, components, and/or a temporal sequence of frames). For example, component 1 of the GOP of channel 1 may described as a three-dimensional data set (i.e., W×H× Number of pictures), all of the components the GOP of channel 1 may described as a four-dimensional data set (i.e., W×H×Number of pictures×Number of components), and all of the components the GOP of layer 1 and the GOP of layer 2 may described as a five-dimensional data set (i.e., W×H× Number of pictures×Number of components×Number of layers).

Multi-layer video coding enables a video presentation to be decoded/displayed as a presentation corresponding to a base layer of video data and decoded/displayed as one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. A sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream.

A video encoder operating according to a typical video coding standard may perform predictive encoding on video blocks and sub-divisions thereof. For example, pictures may be segmented into video blocks which are the largest array of video data that may be predictively encoded and the largest arrays of video data may be further partitioned into nodes. For example, in ITU-T H.265, coding tree units (CTUs) are partitioned into coding units (CUs) according to a quadtree (QT) partitioning structure. A node may be associated with a prediction unit data structure and a residual unit data structure having their roots at the node. A prediction unit data structure may include intra prediction data (e.g., intra prediction mode syntax elements) or inter prediction data (e.g., motion data syntax elements) that may be used to produce reference and/or predicted sample values for the node. For intra prediction coding, a defined intra prediction mode may specify the location of reference samples within a picture. For inter prediction coding, a reference picture may be determined and a motion vector (MV) may identify samples in the reference picture that are used to generate a prediction for a current video block. For example, a current video block may be predicted using reference sample values located in one or more previously coded picture(s) and a motion vector may be used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (i.e., e.g., pixel precision). Previously decoded pictures may be organized into one or more reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture is used to generate a prediction for a current video block and in bi-prediction, a first reference picture and a second reference picture may be used to generate a prediction for a current video block. In bi-prediction, respective sample values may be combined (e.g., added, rounded, and clipped, or averaged according to weights) to generate a prediction. Further, a typical video coding standard may support various modes of motion vector prediction. Motion vector prediction enables the value of a motion vector for a current video block to be derived based on another motion vector. For example, a set of candidate blocks having associated motion information may be derived from spatial neighboring blocks to the current video block and a motion vector for the current video block may be derived from a motion vector associated with one of the candidate blocks.

As described above, intra prediction data or inter prediction data may be used to produce reference sample values for a current block of sample values. The difference between sample values included in a current block and associated reference samples may be referred to as residual data. Residual data may include respective arrays of difference values corresponding to each component of video data. Residual data may initially be calculated in the pixel domain. That is, from subtracting sample amplitude values for a component of video data. A transform, such as, a discrete cosine transform (DCT), a discrete sine transform (DST), an integer transform, a wavelet transform, or a conceptually similar transform, may be applied to an array of sample difference values to generate transform coefficients. It should be noted that in some cases, a core transform and a subsequent secondary transforms may be applied to generate transform coefficients. A quantization process may be performed on transform coefficients or residual sample values directly (e.g., in the case, of palette coding quantization). Quantization approximates transform coefficients (or residual sample values) by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to generating level values (or the like) in some instances and recovering transform coefficients (or the like) in some instances. That is, a quantization process may refer to quantization in some cases and inverse quantization (which also may be referred to as dequantization) in some cases. Further, it should be noted that although in some of the examples quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a prediction for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, as implemented in ITU-T H.265 may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein, each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context may provide a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in a current syntax element and previously coded syntax elements.

Figure 2A:
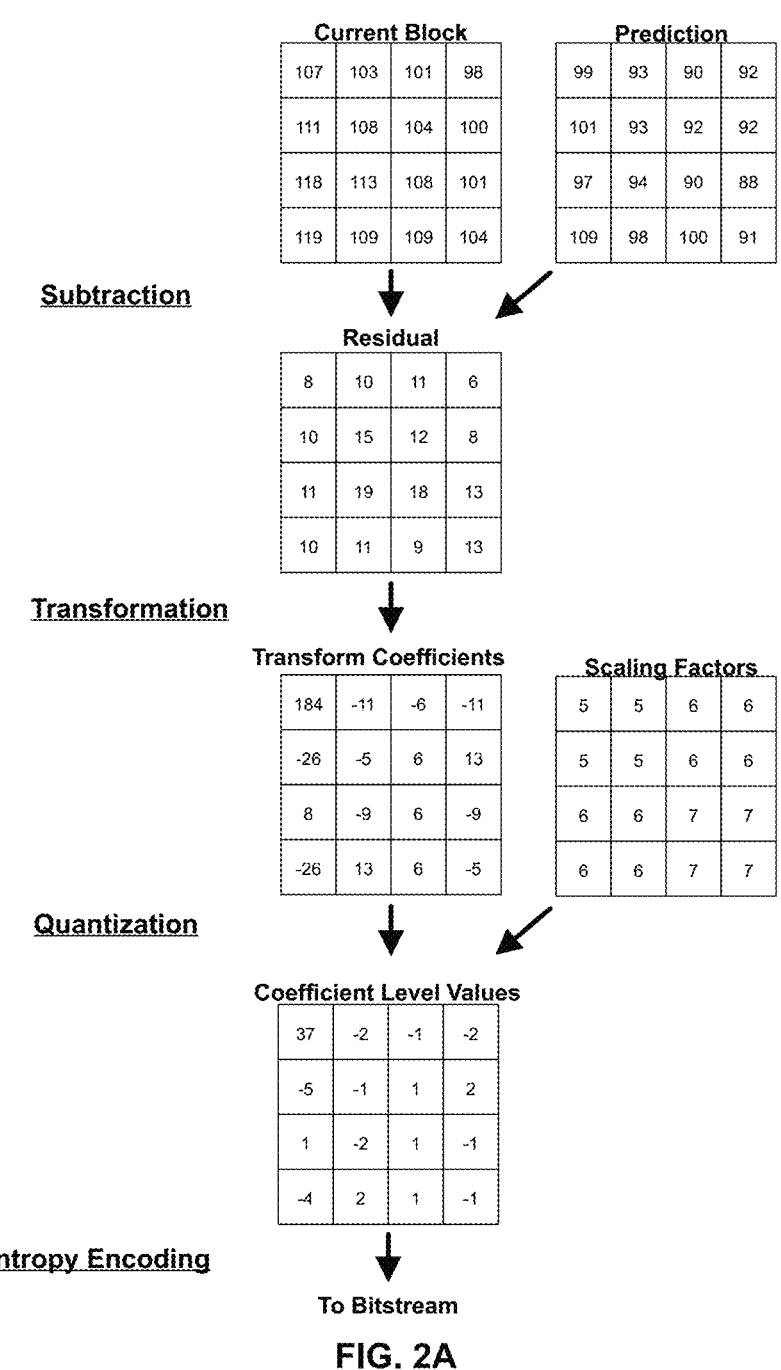
FIGS. 2A-2B are conceptual diagrams illustrating examples of coding a block of video data with typical video coding techniques which may be utilized in accordance with one or more techniques of this disclosure.
Figure 2B:
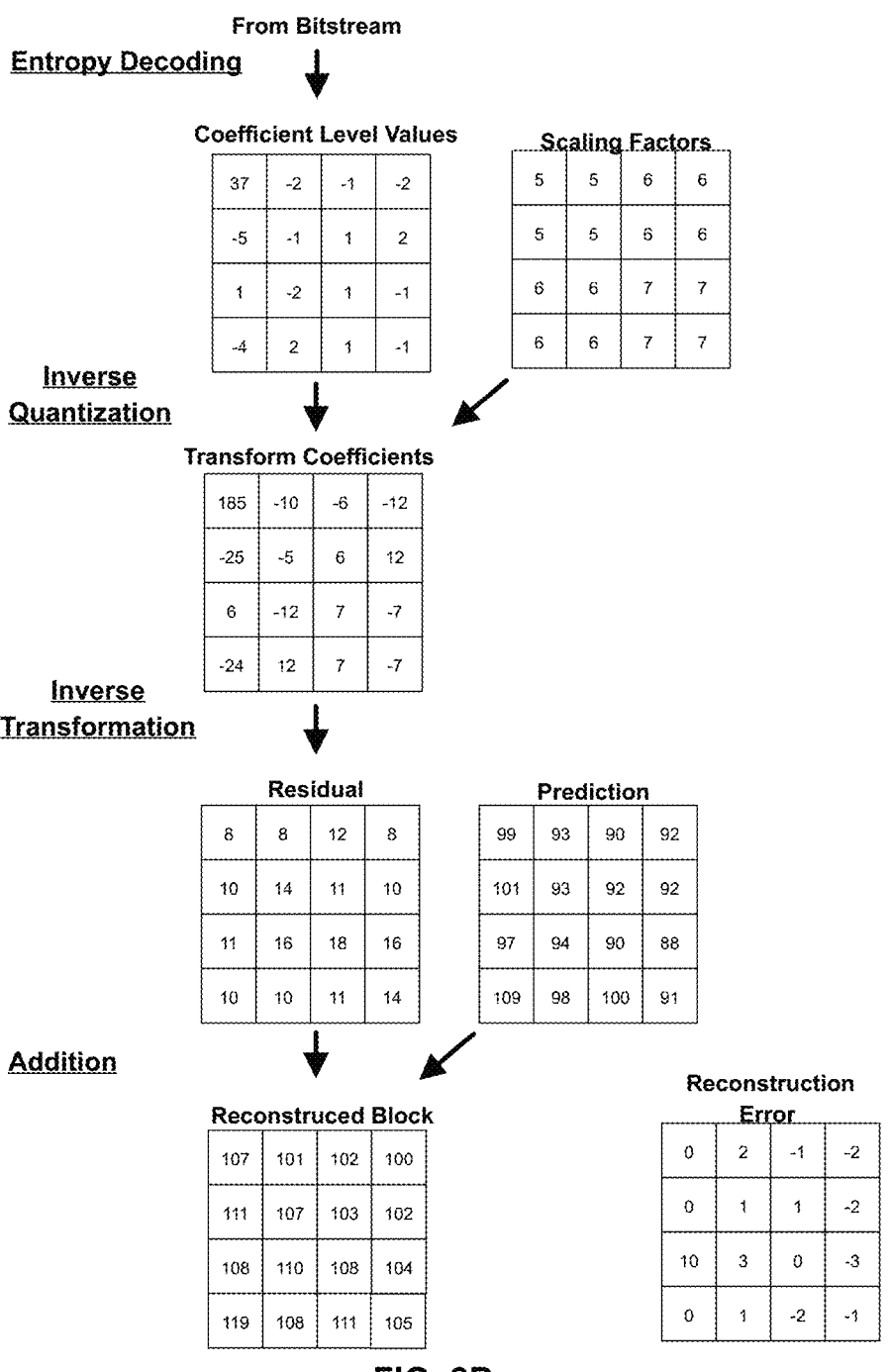

FIGS. 2A-2B are conceptual diagrams illustrating examples of coding a block of video data. As illustrated in FIG. 2A, a current block of video data (e.g., an area of a picture corresponding to a video component) is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In particular, FIG. 2B illustrates a reconstruction error which is the difference between the current block and the reconstructed block. In this manner, coding may be said to be lossy. However, the difference in sample values may be considered minimally perceptible to a viewer of the reconstructed video. That is, the reconstructed video may be said to be fit for human-consumption. However, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize a reconstruction error and/or minimize perceivable artifacts introduced by a video coding process. Such modifications may general be referred to as filtering. It should be noted that filtering may occur as part of an in-loop filtering process or a post-loop filtering process. For an in-loop filtering process, the resulting sample values of a filtering process may be used for further reference and for a post-loop filtering process the resulting sample values of a filtering process are merely output as part of the decoding process (e.g., not used for subsequent coding).

Typical video coding standards may utilize so-called deblocking (or de-blocking), which refers to a process of smoothing the boundaries of neighboring reconstructed video blocks (i.e., making boundaries less perceptible to a viewer) as part of an in-loop filtering process. In addition to applying a deblocking filter as part of an in-loop filtering process, a typical video coding standard may utilized Sample Adaptive Offset (SAO), where SAO is a process that modifies the deblocked sample values in a region by conditionally adding an offset value. Further, a typical video coding standard may utilized one or more additional filtering techniques. For example, in VVC, a so-called adaptive loop filter (ALF) may be applied.

As described above, for coding purposes, each video frame or picture may divided into one or more regions, which may be referred to as video blocks. It should be noted that in some cases, other overlapping and/or independent regions may be defined. For example, according to typical video coding standards, each video picture may be partitioned to include one or more slices and further partitioned to include one or more tiles. With respect to VVC, slices are required to consist of an integer number of complete tiles or an integer number of consecutive complete CTU rows within a tile, instead of only being required to consist of an integer number of CTUs. Thus, in VVC, a picture may include a single tile, where the single tile is contained within a single slice or a picture may include multiple tiles where the multiple tiles (or CTU rows thereof) may be contained within one or more slices. Further, it should be noted that VVC provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, a bitstream of coded video data may include a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 3:
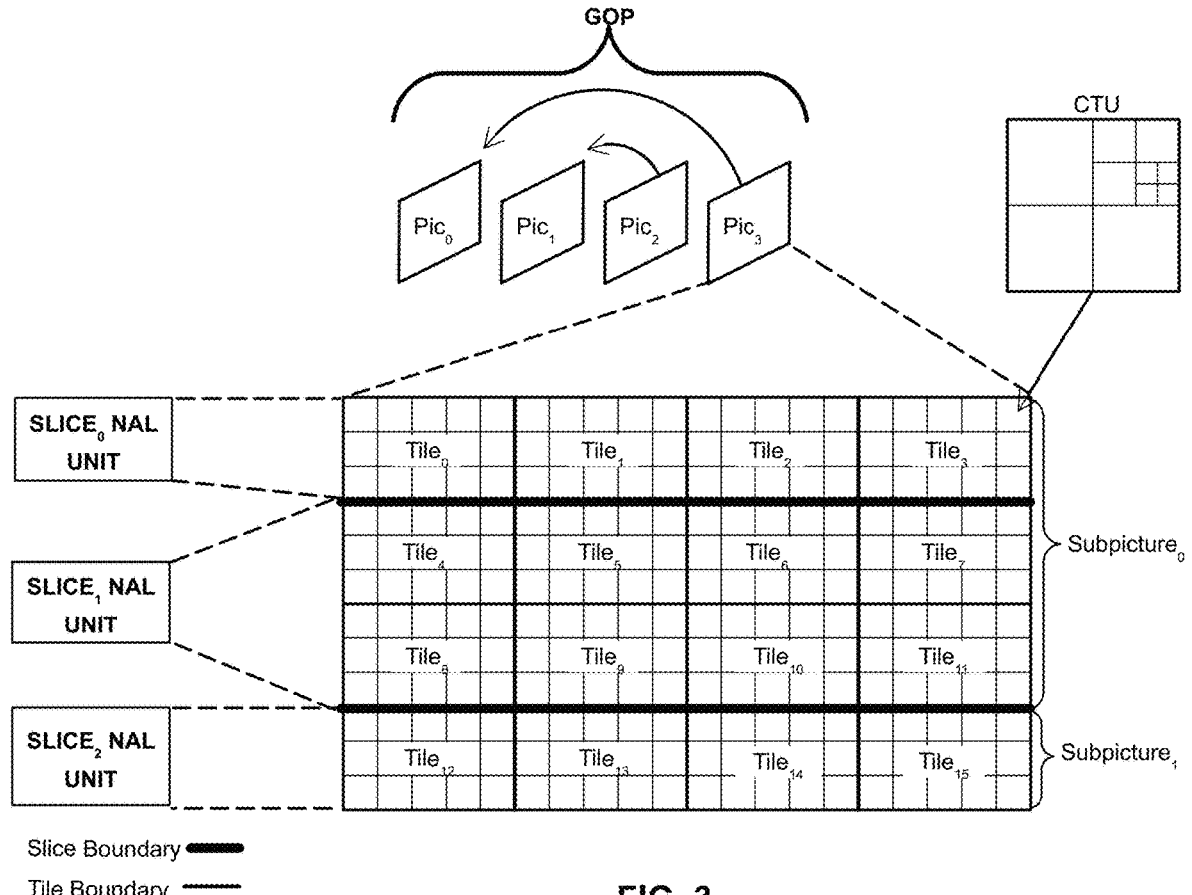
FIG. 3 is a conceptual diagram illustrating coded video data and corresponding data structures associated with typical video coding techniques which may be utilized in accordance with one or more techniques of this disclosure.

FIG. 3 is a conceptual diagram illustrating an example of a picture within a group of pictures partitioned according to tiles, slices, and subpictures and the corresponding coded video data encapsulated into NAL units. It should be noted that the techniques described herein may be applicable to tiles, slices, subpictures, sub-divisions thereof and/or equivalent structures thereto. That is, the techniques described herein may be generally applicable regardless of how a picture is partitioned into regions. In the example illustrated in FIG. 3, $Pic_3$ is illustrated as including 16 tiles (i.e., $Tile_0$ to $Tile_{15}$) and three slices (i.e., $Slice_0$ to $Slice_2$). In the example illustrated in FIG. 3, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 3, $Pic_3$ includes two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. According to a typical video coding standard, when a picture is decoded it may be stored to a decoded picture buffer (DPB) (which may be referred to as frame buffer, a reference buffer, a reference picture buffer, or the like). For example, referring to FIG. 3, $Pic_2$ is illustrated as referencing $Pic_1$. Similarly, $Pic_3$ is illustrated as referencing $Pic_0$. With respect to FIG. 3, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_o$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

Figure 4:
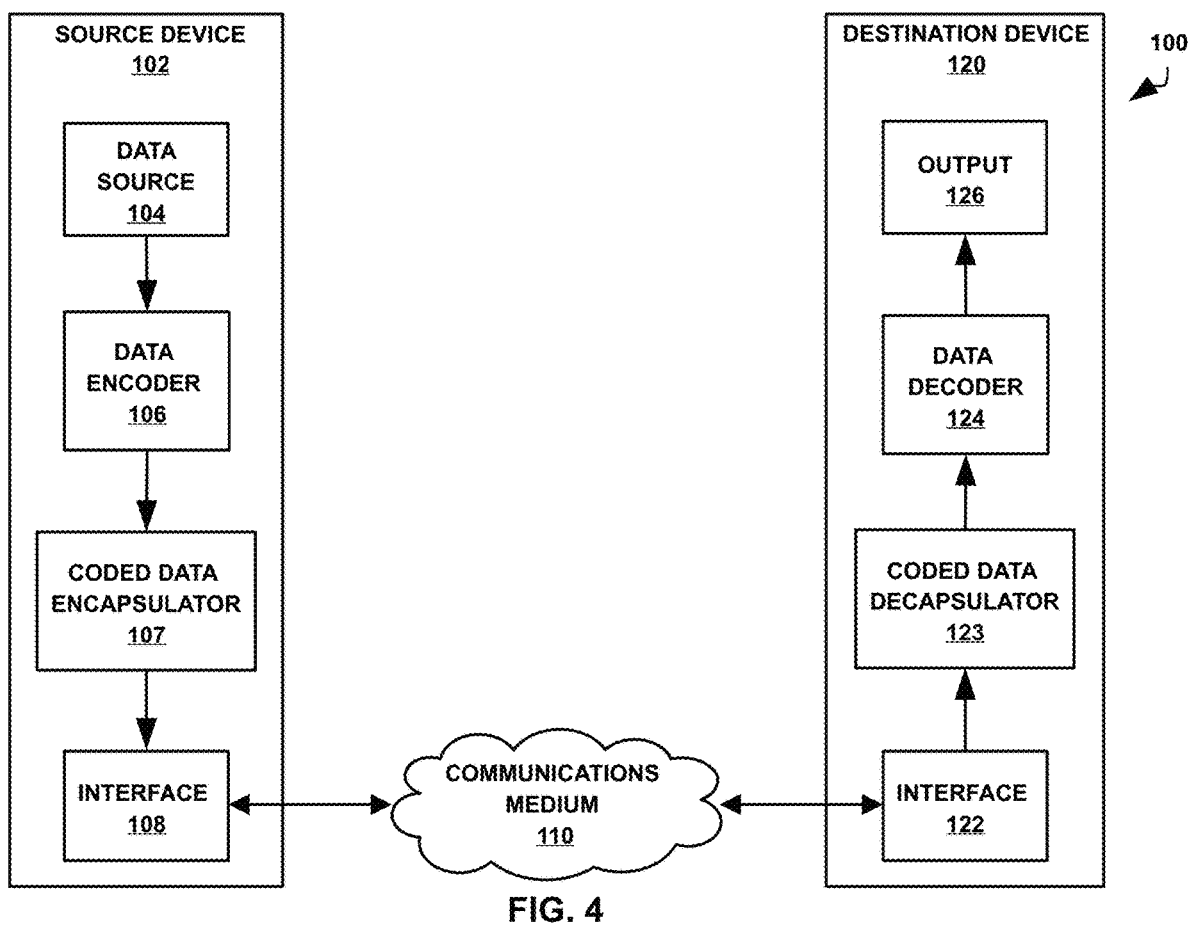
FIG. 4 is a block diagram illustrating an example of a system that may be configured to encode and decode multi-dimensional data according to one or more techniques of this disclosure.

FIG. 4 is a block diagram illustrating an example of a system that may be configured to code (i.e., encode and/or decode) a multi-dimensional data set (MDDS) according to one or more techniques of this disclosure. It should be noted that in some cases an MDDS may be referred to as a tensor. System 100 represents an example of a system that may encapsulate coded data according to one or more techniques of this disclosure. As illustrated in FIG. 4, system 100 includes source device 102, communications medium 110, and destination device 120. In the example illustrated in FIG. 4, source device 102 may include any device configured to encode multi-dimensional data and transmit encoded data to communications medium 110. Destination device 120 may include any device configured to receive encoded data via communications medium 110 and to decode encoded data. Source device 102 and/or destination device 120 may include computing devices equipped for wired and/or wireless communications and may include, for example, set top boxes, digital video recorders, televisions, computers, gaming consoles, medical imagining devices, and mobile devices, including, for example, smartphones.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 4, source device 102 includes data source 104, data encoder 106, coded data encapsulator 107, and interface 108. Data source 104 may include any device configured to capture and/or store multi-dimensional data. For example, data source 104 may include a video camera and a storage device operably coupled thereto. Data encoder 106 may include any device configured to receive multi-dimensional data and generate a bitstream representing the data. A bitstream may refer to a general bitstream (i.e., binary values representing coded data) or a compliant bit-stream where aspects of a compliant bitstream may be defined according to a standard, e.g., a video coding stan-dard. Data encapsulator 107 may receive a bitstream and encapsulate the bitstream of purposes of storage and/or transmission. For example, data encapsulator 107 may encapsulate bitstream according to a file format. It should be noted that data encapsulator 107 need not necessary be located in the same physical device as data encoder 106. For example, functions described as being performed by data encoder 106 and data encapsulator 107 may be distributed among devices in a computing system (e.g., at distinct server locations). Interface 108 may include any device configured to receive data generated by coded data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, pro-prietary bus protocols, Universal Serial Bus (USB) proto-cols, I²C, or any other logical and physical structure that may be used to interconnect peer devices.

Referring again to FIG. 4, destination device 120 includes interface 122, coded data decapsulator 123, data decoder 124, and output 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a com-pliant video bitstream to be retrieved from a storage device. For example, interface 122 may include a chipset supporting PCI and PCIe bus protocols, proprietary bus protocols, USB protocols, I²C, or any other logical and physical structure that may be used to interconnect peer devices. Coded data decapsulator 123 may be configured to receive and extract a bitstream from an encapsulated format. For example, in the case of video coded according to a typical video coding standard stored on physical medium according to a defined file format, coded data decapsulator 123 may be configured to extract a compliant bitstream from the file. Data decoder 124 may include any device configured to receive a bit-stream and/or acceptable variations thereof and reproduce multi-dimensional data therefrom. Reproduced multi-di-mensional data may then be received by output 126. For example, in the case of video, output 126 may include a display device configured to display video data. Further, it should be noted that data decoder 124 may be configured to output multi-dimensional data to various types of devices and/or sub-components thereof. For example, data decoder 124 may be configured to output data to any communication medium.

Figure 5:
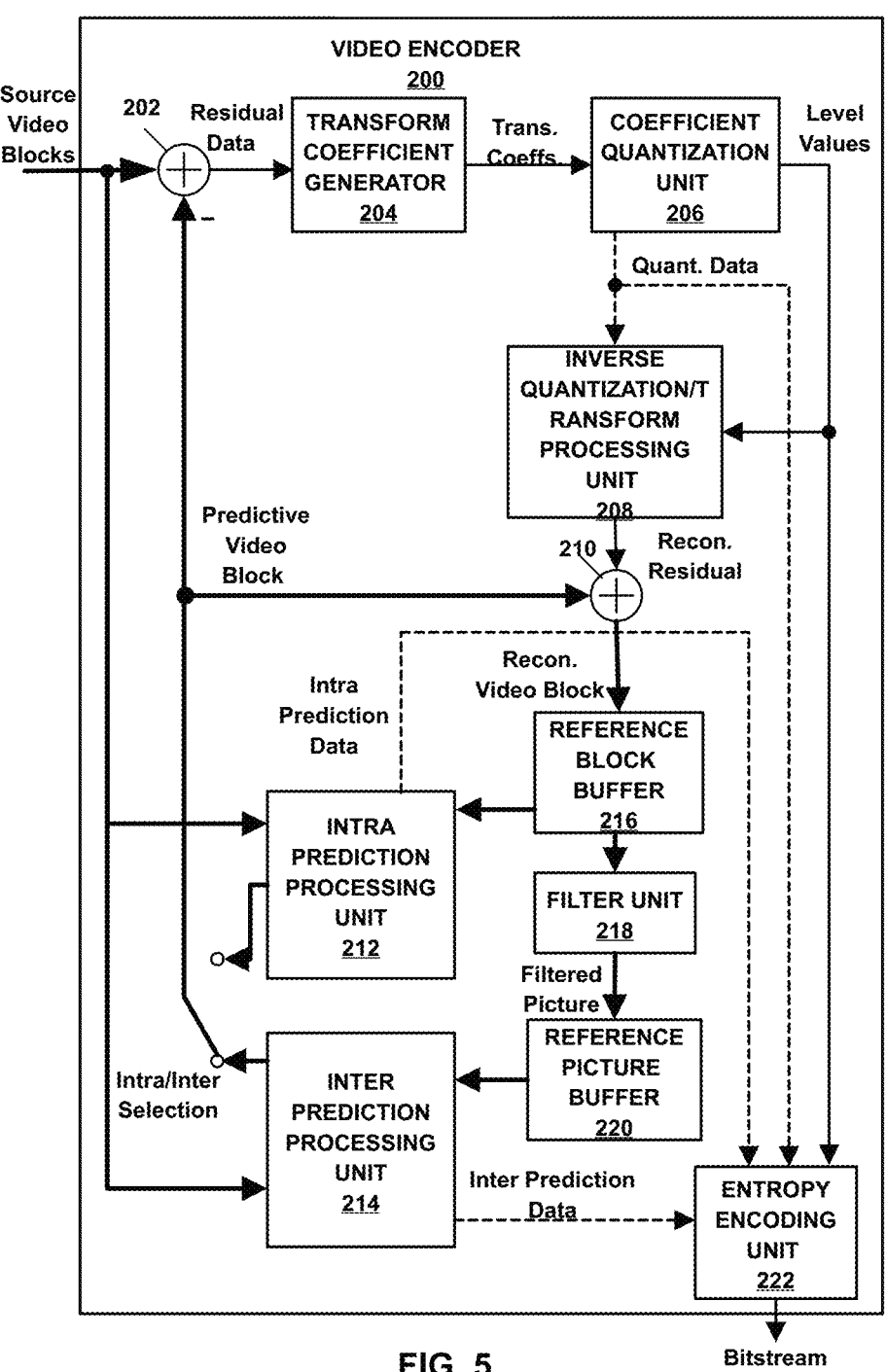
FIG. 5 is a block diagram illustrating an example of a video encoder that may be configured to encode video data in accordance with typical video encoding techniques which may be utilized with one or more techniques of this disclosure.

As described above, data encoder 106 may include any device configured to receive multi-dimensional data and an example of multi-dimensional data includes video data which may be coded according to a typical video coding standard. As described in further detail below, in some example, techniques for coding multi-dimensional data described herein may be utilized in conjunction with tech-niques utilized in typical video standards. FIG. 5 is a block diagram illustrating an example of a video encoder that may be configured to encode video data in accordance with typical video encoding techniques. It should be noted that although example video encoder 200 is illustrated as having distinct functional blocks, such an illustration is for descrip-tive purposes and does not limit video encoder 200 and/or sub-components thereof to a particular hardware or software architecture. Functions of video encoder 200 may be real-ized using any combination of hardware, firmware, and/or software implementations. Video encoder 200 may perform intra prediction coding and inter prediction coding of picture areas, and, as such, may be referred to as a hybrid video encoder. In the example illustrated in FIG. 5, video encoder 200 receives source video blocks. In some examples, source video blocks may include areas of picture that has been divided according to a coding structure. For example, source video data may include CTUs, sub-divisions thereof, and/or another equivalent coding unit. In some examples, video encoder 200 may be configured to perform additional sub-divisions of source video blocks. It should be noted that the techniques described herein are generally applicable to video coding, regardless of how source video data is parti-tioned prior to and/or during encoding. In the example illustrated in FIG. 5, video encoder 200 includes summer 202, transform coefficient generator 204, coefficient quan-tization unit 206, inverse quantization and transform coef-ficient processing unit 208, summer 210, intra prediction processing unit 212, inter prediction processing unit 214, reference block buffer 216, filter unit 218, reference picture buffer 220, and entropy encoding unit 222. As illustrated in FIG. 5, video encoder 200 receives source video blocks and outputs a bitstream.

In the example illustrated in FIG. 5, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a DCT or a conceptually similar trans-form, to the residual block or sub-divisions thereof (e.g., four 8×8 transforms may be applied to a 16×16 array of residual values) to produce a set of transform coefficients. Transform coefficient generator 204 may be configured to perform any and all combinations of the transforms included in the family of discrete trigonometric transforms, including approximations thereof. Transform coefficient generator 204 may output transform coefficients to coefficient quantization unit 206. Coefficient quantization unit 206 may be config-ured to perform quantization on the transform coefficients. The quantization process may reduce the bit depth associ-ated with some or all of the coefficients. The degree of quantization may alter the rate-distortion (i.e., bit-rate vs. quality of video) of encoded video data. In a typical video coding standard, the degree of quantization may be modified by adjusting a quantization parameter (QP) and a quantiza-tion parameter may be determined based on signaled and/or predicted values. QP data may include any data used to determine a QP for quantizing a particular set of transform coefficients. As illustrated in FIG. 5, quantized transform coefficients (which may be referred to as level values) are output to inverse quantization and transform coefficient processing unit 208. Inverse quantization and transform coefficient processing unit 208 may be configured to apply an inverse quantization and an inverse transformation to generate reconstructed residual data. As illustrated in FIG. 5, at summer 210, reconstructed residual data may be added to a predictive video block. Reconstructed video blocks may be stored to reference block buffer 216 and used as reference for predicting subsequent blocks (e.g., using intra prediction).

Referring again to FIG. 5, intra prediction processing unit 212 may be configured to select an intra prediction mode for a video block to be coded. Intra prediction processing unit 212 may be configured to evaluate reconstructed blocks stored to reference block buffer 216 and determine an intra prediction mode to use to encode a current block. In a typical video coding standard, possible intra prediction modes may include planar prediction modes, DC prediction modes, and angular prediction modes. As illustrated in FIG. 5, intra prediction processing unit 212 outputs intra prediction data (e.g., syntax elements) to entropy encoding unit 222.

Referring again to FIG. 5, inter prediction processing unit 214 may be configured to perform inter prediction coding for a current video block. Inter prediction processing unit 214 may be configured to receive source video blocks, select a reference picture from pictures stored to the reference buffer 220, and calculate a motion vector for a video block. A motion vector may indicate the displacement of a prediction unit of a video block within a current video picture relative to a predictive block within a reference picture. Inter prediction coding may use one or more reference pictures. Inter prediction processing unit 214 may be configured to select predictive block(s) by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within reference picture buffer 220. It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 222.

Referring again to FIG. 5, filter unit 218 receives reconstructed video blocks from reference block buffer 216 and outputs a filtered picture to reference picture buffer 220. That is, in the example of FIG. 5, filter unit 218 is part of an in-loop filtering process. Filter unit 218 may be configured to perform one or more of deblocking, SAO filtering, and/or ALF filtering, for example, according to a typical video coding standard. Entropy encoding unit 222 receives data representing level values (i.e., quantized transform coefficients) and predictive syntax data (i.e., intra prediction data and motion prediction data). It should be noted that data representing level values may include for example, flags, absolute values, sign values, delta values, and the like. For example, significant coefficient flags and the like as provided in a typical video coding standard. Entropy encoding unit 518 may be configured to perform entropy encoding according to one or more of the techniques described herein and output a bitstream, for example, a compliant bitstream according to a typical video coding standard.

Figure 6:
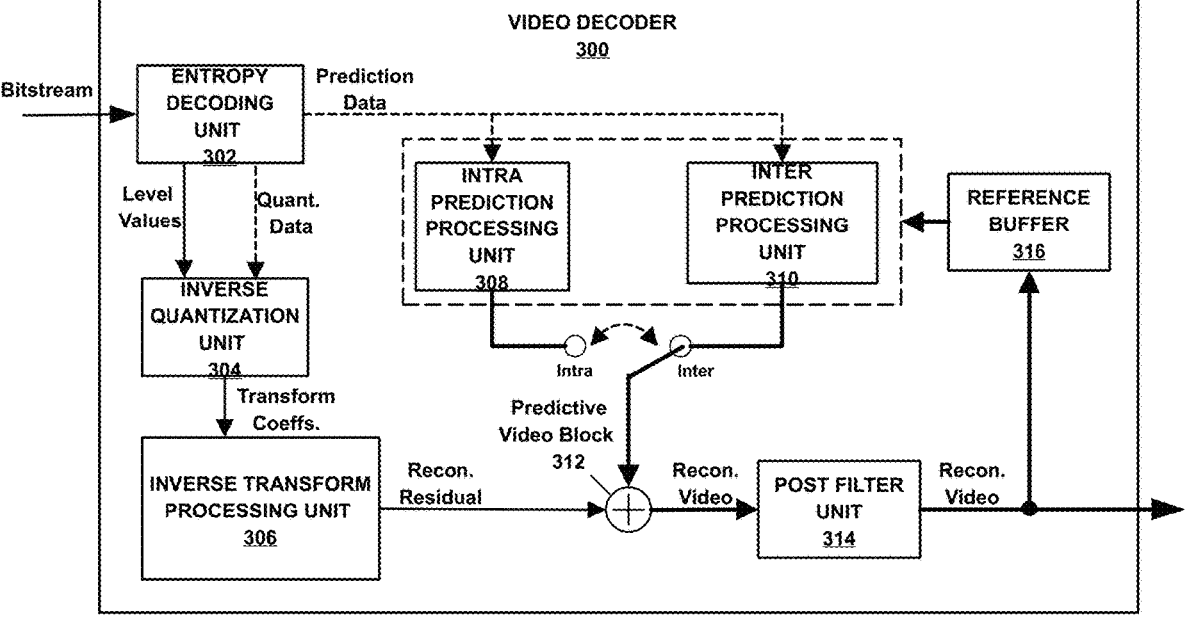
FIG. 6 is a block diagram illustrating an example of a video decoder that may be configured to decode video data in accordance with typical video decoding techniques which may be utilized with one or more techniques of this disclosure.

Referring again to FIG. 4, as described above, data decoder 106 may include any device configured to receive coded multi-dimensional data and an example of coded multi-dimensional data includes video data which may be coded according to a typical video coding standard. FIG. 6 is a block diagram illustrating an example of a video decoder that may be configured to decode video data in accordance with typical video decoding techniques which may be utilized with one or more techniques of this disclosure. In the example illustrated in FIG. 6, video decoder 300 includes an entropy decoding unit 302, inverse quantization unit 304, inverse transform coefficient processing unit 306, intra prediction processing unit 308, inter prediction processing unit 310, summer 312, post filter unit 314, and reference buffer 316. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 6, entropy decoding unit 302 receives an entropy encoded bitstream. Entropy decoding unit 302 may be configured to decode syntax elements and level values from the bitstream according to a process reciprocal to an entropy encoding process. Entropy decoding unit 302 may be configured to perform entropy decoding according any of the entropy coding techniques described above and/or determine values for syntax elements in an encoded bitstream in a manner consistent with a video coding standard. As illustrated in FIG. 6, entropy decoding unit 302 may determine level values, quantization data, and prediction data from a bitstream. In the example, illustrated in FIG. 6, inverse quantization unit 304 receives quantization data and level values and outputs transform coefficients to inverse transform coefficient processing unit 306. Inverse transform coefficient processing unit 306 outputs reconstructed residual data. Thus, inverse quantization unit 304 and inverse transform coefficient processing unit 306 operate in a similar manner to inverse quantization and transform coefficient processing unit 208 described above.

Referring again to FIG. 6, reconstructed residual data is provided to summer 312. Summer 312 may add reconstructed residual data to a predictive video block and generate reconstructed video data. A predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more pictures (and corresponding regions) of video data. Intra prediction syntax elements may identify an intra prediction mode, such as the intra prediction modes described above. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Post filter unit 314 may be configured to perform filtering on reconstructed video data. For example, post filter unit 314 may be configured to perform deblocking based on parameters specified in a bitstream. Further, it should be noted that in some examples, post filter unit 314 may be configured to perform proprietary discretionary filtering (e.g., visual enhancements, such as, mosquito noise reduction). As illustrated in FIG. 6, a reconstructed video may be output by video decoder 300, for example, to a display.

As described above with respect to FIGS. 2A-2B, a block of video data, i.e., an array of data included within a MDDS, may be encoded by generating a residual, performing a transformation on the residual, and quantizing the transform coefficients to generate level values and decoded by performing inverse quantization on level values, performing an inverse transform, and adding the resulting residual to a prediction. An array of data included within a MDDS may also be coded using so-called autoencoding techniques. Generally, autoencoding may refer to a learning technique that imposes a bottleneck into a network to force a compressed representation of an input. That is, an autoencoder may be referred to as a non-linear Primary Component Analysis (PCA) that tries to represent input data in a lower dimensional space. An example of an autoencoder includes a convolution autoencoder that compresses an input using a single convolution operation. Convolution autoencoders may be utilized in so-called deep convolutional neural networks (CNNs).

Figure 7A:
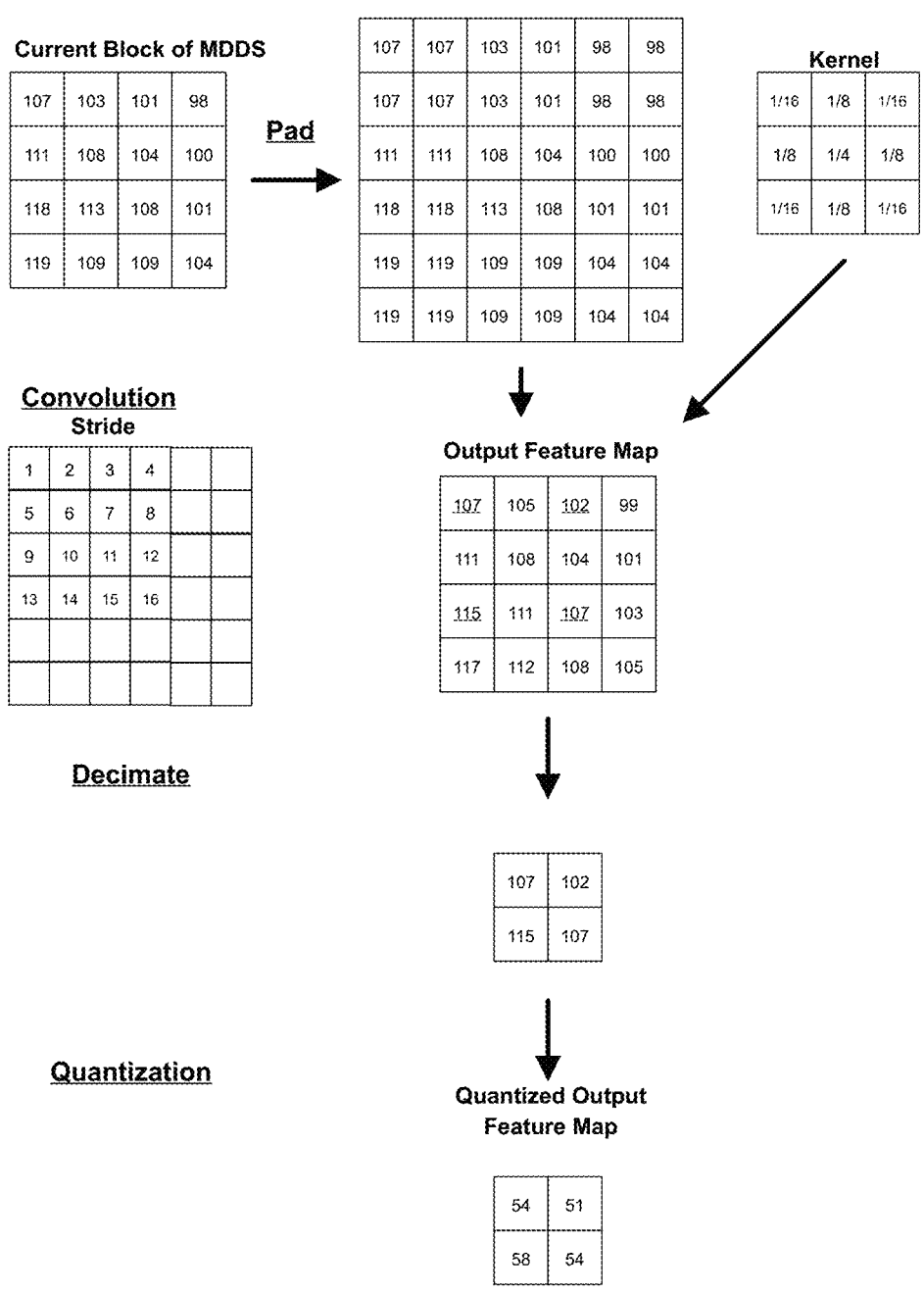
FIGS. 7A-7B are conceptual diagrams illustrating examples of coding a block of video data in accordance with autoencoding techniques which may be utilized with one or more techniques of this disclosure.

FIG. 7A illustrates an example of autoencoding using a two-dimensional discrete convolution. In the example illustrated in FIG. 7A, a discrete convolution is performed on a current block of video data (i.e., the block of video data illustrated in FIG. 2A) to generate an output feature map (OFM), where the discrete convolution is defined according to a padding operation, a kernel, and a stride function. It should be noted that although FIG. 7A illustrates a discrete convolution on a two-dimensional input using a two-dimensional kernel, discrete convolution may be performed on higher dimensional data sets. For example, discrete convolution may be performed a three-dimensional input using a three-dimensional kernel (e.g., a cubic kernel). In the case of video data, such a convolution may down-sample video in both the spatial and temporal dimensions. Further, it should be noted that although the example illustrated in FIG. 7A illustrates where a square kernel is convolved over a square input, in other examples, the kernel and/or the input may be non-square rectangles. In the example illustrated in FIG. 7A, the 4×4 array of video data is upscaled to a 6×6 array by duplicating the nearest value at the boundary. This is an example of a padding operation. In general, a padding operation increases the size of an input data set by inserting values. In a typical case, zero values may be inserted into an array in order to achieve a particular sized array prior to convolution. It should be noted padding functions may include one or more of inserting zero's (or another default value) at particular locations, symmetric extension, replicate extension, circular extension at various positions of a data set. For example, for symmetric extension input array values outside the bounds of the array may be computed by mirror-reflecting the array across the array border along the dimension being padded. For replicate extension input array values outside the bounds of the array may be assumed to equal the nearest array border value along the dimension being padded. For circular extension, input array values outside the bounds of the array may be computed by implicitly assuming the input array is periodic along the dimension being padded.

Referring again to FIG. 7A, an output feature map is generated by convolving a 3×3 kernel over the 6×6 array according to a stride function. That is, the stride illustrated in FIG. 7A illustrates the top-left position of the kernel at a corresponding position in the 6×6 array. That is, for example, at stride position 1, the top-left of the kernel is aligned with the top-left of the 6×6 array. At each discrete position of the stride, the kernel is used to generate a weighted sum. Generated weighted sum values are then used to populate a corresponding position in an output feature map. For example, at position 1 of the stride function, the output of 107 ($107 = \frac{1}{16}*107 + \frac{1}{8}*107 + \frac{1}{16}*103 + \frac{1}{8}*107 + \frac{1}{4}*107 + \frac{1}{8}*103 + \frac{1}{16}*111 + \frac{1}{8}*111 + \frac{1}{16}*108$) corresponds to the top-left position of the output feature map. It should be noted that in the example illustrated in FIG. 7A, the stride function corresponds to a so-called unit stride, i.e., the kernel slides across every position of the input. In other examples, non-unit or arbitrary strides may be used. For example, a stride function may include only the positions 1, 4, 13, and 16 in the stride illustrated in FIG. 7A to generate a 2×2 output feature map. In this manner, in the case of two-dimensional discrete convolution, for an input data having a width, $w_i$, and height, $h_i$, an arbitrary padding function, an arbitrary stride function, and a kernel having a width, $w_k$, and height, $h_k$, may be used to create an output feature map having a desired width, $w_o$, and height, $h_o$. It should be noted, that similar to a kernel, a stride function may be defined for multiple dimensions (e.g., a three-dimensional stride function may be defined). It should be noted that in some cases, for particular kernel size and stride function, the kernel may lie outside of the support region. In some cases, the output at such a position is not valid. In some cases, a corresponding value is derived for the out-of-bound support position, e.g., according to a padding operation.

It should be noted that in the example illustrated in FIG. 7A, the 4×4 array of video data is illustrated as being down-sampled to a 2×2 output feature map by selecting the underlined values of the 4×4 output feature map. The 4×4 output feature map is shown for illustration purposes. That is, to illustrate a typical unit stride function. In a typical case, computations would not be made for discarded values. In a typical case, as described above, the 2×2 output feature map could/would be derived by performing the weighted sum operation with the kernel at positions 1, 4, 13, and 16. However, it should be noted that in other examples, so-called pooling operations, such as finding a maximum pooling, may be performed on an input (prior to performing the convolution) or an output feature map to down-sample a data set. For example, in the example illustrated in FIG. 7A, the 2×2 output feature map may be generated by taking a local maximum of each 2×2 region in the 4×4 output feature map (i.e., 108, 104, 117, and 108). That is, there may be numerous ways to perform autoencoding that includes convolutions on input data in order to represent the data as a down-sampled output feature map.

Finally, as indicated in FIG. 7A, an output feature map may be quantized in a manner similar to that described above with respect to transform coefficients (e.g., amplitudes restricted to a set of specified values). In the example illustrated in FIG. 7A, the amplitudes of the 2×2 output feature map are quantized by division by 2. In this case, quantization may be described as a uniform quantization defined by:

$$QOFM(x, y) = \text{round}(OFM(x, y) / Stepsize)$$

Where,
   QOFM(x,y) is a quantized value corresponding position (x,y);
   OFM(x,y) is a value corresponding position (x,y);
   Stepsize is a scalar; and round(x) rounds x to the nearest integer.

Thus, for the example illustrated in FIG. 7A, Stepsize=2 and x=0 ... 1, y=0 ... 1. In this example, at an autodecoder, the inverse quantization for deriving the recovered output feature map, ROFM(x,y) may be defined as follows:

$$ROFM(x, y) = QOFM(x, y) * Stepsize$$

It should be noted that in one example, a respective Stepsize may be provided for each position, i.e., $Stepsize_{(x, y)}$. It should be noted that this may be referred to a uniform quantization, as across the range of possible amplitudes at a position in OFM(x,y) the quantization (i.e., scaling is same).

In one example, quantization may be non-uniform. That is, the quantization may differ across the range of possible amplitudes. For example, respective Stepsizes may vary across a range of values. That is, for example, in one example, a non-uniform quantization function may be defined as follows:

$$QOFM(x, y) = round(OFM(x, y) / Stepsize_i)$$

Where
  $Stepsize_i$=$scalar_0$: if OFM(x,y)<$value_0$
    $scalar_j$: if $value_0 \leq$ OFM(x,y)$\leq value_1$
    . . .
    $scalar_{N-1}$: if $value_{N-2} \leq$ OFM(x,y)$\leq value_{N-1}$
    $scalar_N$: if OFM(x,y)>$value_{N-1}$ Further, it should be noted that as described above, quantization may include mapping an amplitude in a range to a particular value. That is, for example, in one example, non-uniform quantization function may be defined as:

$$QOFM(x, y) = \begin{cases} s_o & OFM(x, y) < value_0 \\ s_1 & value_0 \leq OFM(x, y) < value_1 \\ \vdots & \vdots \\ s_N & value_N \leq OFM(x, y) \end{cases}$$

Where, $value_{i+1}$>$value_i$ and $value_{i+1}$−$value_i$ does not have to equal $value_{j+1}$−$value_j$ for i≠j
The inverse of the non-uniform quantization process, may be defined as:

$$ROFM(x, y) = \begin{cases} r_o & QOFM(x, y) = s_0 \\ r_1 & QOFM(x, y) = s_1 \\ \vdots & \vdots \\ r_N & QOFM(x, y) = s_N \end{cases}$$

The inverse process corresponds to a lookup table and may be signaled in the bitstream.

Finally, it should be noted that combinations of the quantization techniques described above may be utilized and in some cases, specific quantization functions may be specified and signaled. For example, in VVC quantization tables may be signaled.

Referring again to FIG. 7A, although not shown, but as described in further detail below, entropy encoding may be performed on quantized output feature map data. Thus, as illustrated in FIG. 7A, the quantized output feature map is a compressed representation of the current video block.

Figure 7B:
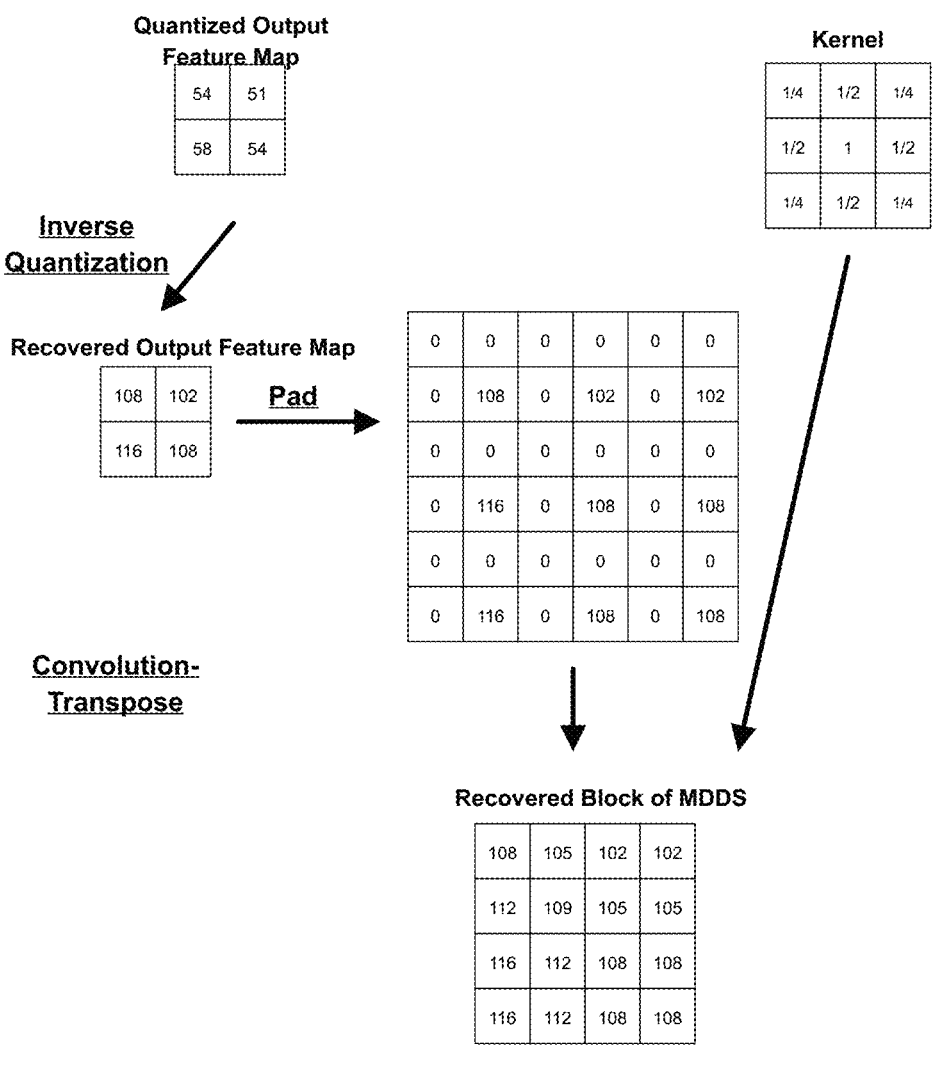

As illustrated in FIG. 7B, the current block of video data is decoded by performing inverse quantization on the quantized output feature map, performing a padding operation on the recovered output feature map, and convolving the padded output feature map with a kernel. Similar to FIG. 2B, FIG. 7B illustrates a reconstruction error which is the difference between current block and recovered block. It should be noted that the padding operation performed in FIG. 7B is different than the padding operation performed in FIG. 7A and the kernel utilized in FIG. 7B is different than the kernel utilized in FIG. 7A. That is, in the example illustrated in FIG. 7B, zero values are interleaved with the recovered output feature map, and the 3×3 kernel in convolved over the 6×6 input using a unit stride resulting in the recovered block of MDDS. It should be noted that such a convolution operation performed during autodecoding may be referred to as a convolution-transpose (convT). It should be noted that a convolution-transpose, in some cases may define a specific relationship between kernels at each of an autoencoder and autodecoder and in other cases, the term convolution-transpose may be more general. It should be noted that there may be several ways in which autodecoding may be implemented. That is, FIG. 7B provides an illustrative case of a convolution-transpose and there numerous ways in which a convolution-transpose (and autodecoding) may be performed and/or implemented. The techniques described herein are generally applicable to autodecoding. For example, with respect to the example illustrated in FIG. 7B, in a simple case, each of the four values illustrated in the recovered output feature map may be duplicated to create a 4×4 array (i.e., an array having its top-left four values as 108, its top-right four values as 102, its bottom-left four values as 116, and its bottom-right four values as 108). Further, other padding operations, kernels, and/or stride functions may be utilized. Essentially, at an autodecoder, an autodecoding process may be selected in a manner that achieves a desired objective, for example, reducing a reconstruction error. It should be noted the other desired objectives may include reducing visual artifacts, increasing the probability an object is detected, etc.

As described above, techniques for coding multi-dimensional data described herein may be utilized in conjunction with techniques utilized in typical video standards. As described above, with respect to FIG. 5, the degree of quantization applied during video encoding may alter the rate-distortion of encoded video data. Further, a typical video encoder selects an intra prediction mode for intra prediction and reference frame(s) and motion information for inter prediction. These selections also alter the rate-distortion. That is, in general, video encoding includes selecting video encoding parameters in a manner that optimizes and/or provides a desired rate-distortion. According to the techniques herein, in one example, autoencoding may be used during video encoding in order to select video encoding parameters in order to achieve a desired rate-distortion.

Figure 8:
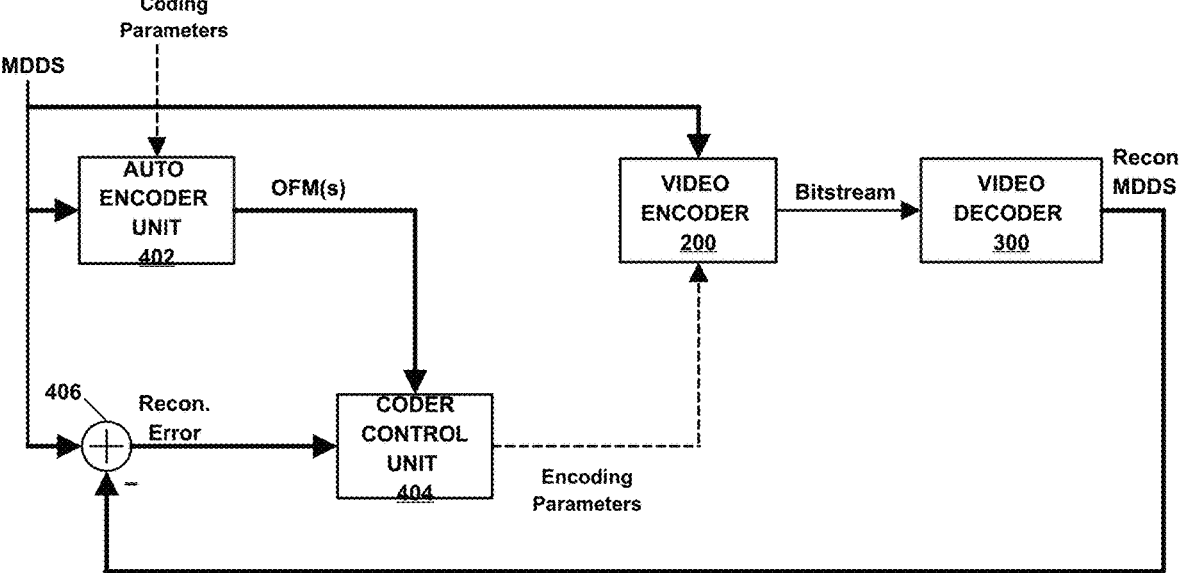
FIG. 8 is an example of a coding system that may encode a multi-dimensional data set in accordance with one or more techniques of this disclosure.

FIG. 8 is an example of a coding system that may encode a multi-dimensional data set in accordance with one or more techniques of this disclosure. In the example illustrated in FIG. 8, autoencoder unit 402 receives a multi-dimensional data set, that is, video data, and generates one or more output feature maps corresponding to the video data. That is, for example, autoencoder may perform two-dimensional discrete convolution as described above on regions within a video sequence. It should be noted that in FIG. 8, the coding parameters illustrated as being received by autoencoder unit 402 correspond to selection of parameters for performing autoencoding. That is, for example, in the case of two-dimensional discrete convolution, selection of $w_i$ and $h_j$, selection of a padding function, selection of stride function, and selection of a kernel. As illustrated in FIG. 8, coder control unit 404 receives the output feature maps and provides coding parameters (e.g., a QP, intra prediction modes, motion information, etc.) to video encoder 200. Video encoder 200 receives video data and provides a bitstream based on the encoding parameters according to a typical video coding standard as described above. Video decoder 300 receives the bitstream and reconstructs the video data according to a typical video coding standard as described above. As illustrated in FIG. 8, summer 406, subtracts the reconstructed video data from the source video data and generates a reconstruction error, i.e., e.g., in a manner similar to that described above with respect to FIG. 2B. As illustrated in FIG. 8, coder control unit 404 receives the reconstruction error. It should be noted that although not explicitly shown in FIG. 8, coder control unit 404 may determine a bit-rate corresponding to a bitstream. Thus, coder control unit 404 may correlate output feature map(s) (i.e., e.g., statistics thereof) corresponding to video data, encoding parameters used for encoding video, a reconstruction error, and a bit-rate. That is, coder control unit 404 may determine a rate-distortion for video data encoded using a particular set of encoding parameters and having particular OFMs. In this manner, through multiple iterations of encoding the same video data (or a training set of video data) with different encoding parameters coder control unit 404 may be said to be able learn (or train) which encoding parameters optimize rate-distortion for various types of video data. That is, for example, output feature maps with relatively low of variance may correlate to images having large low-texture regions and may be relatively less sensitive to changes in degrees of quantization. That is, in this case, for this types of images rate-distortion may optimized by increasing quantization.

As described above, with respect to FIGS. 7A-7B, auto-encoding may be performed on video data to generate a quantized output feature map data. A quantized output feature map is a compressed representation of the current video block. In some cases, that is, based on how autoencoding is performed an output feature map may effectively be a down-sampled version of video data. For example, referring to FIG. 7A, the 4×4 array of video data may be compressed to a 2×2 array (before or after quantization). In a case where the 4×4 array of video data is one of several 4×4 arrays of video data included in a 1920×1080 resolution picture, autoencoding each 4×4 array as illustrated in FIG. 7A may effectively down-sample the 1920×1080 resolution picture to a 960×540 resolution picture. It should be noted that in some cases, quantization may include adjusting a number of bits used to represent a sample value. That is, for example, mapping 10-bit values to 8-bit values. In this case, the quantized values may have the sample amplitude range as the non-quantized values, but the fidelity of the amplitude data is reduced. In one example, according to the techniques herein, such a down-sampled representation of video data may be coded according to a typical video coding standard. Further, according to the techniques herein, autoencoding may be used during the video encoding in order to select video encoding parameters in order to achieve a desired rate-distortion, for example, as described above with respect to FIG. 8.

Figure 9:
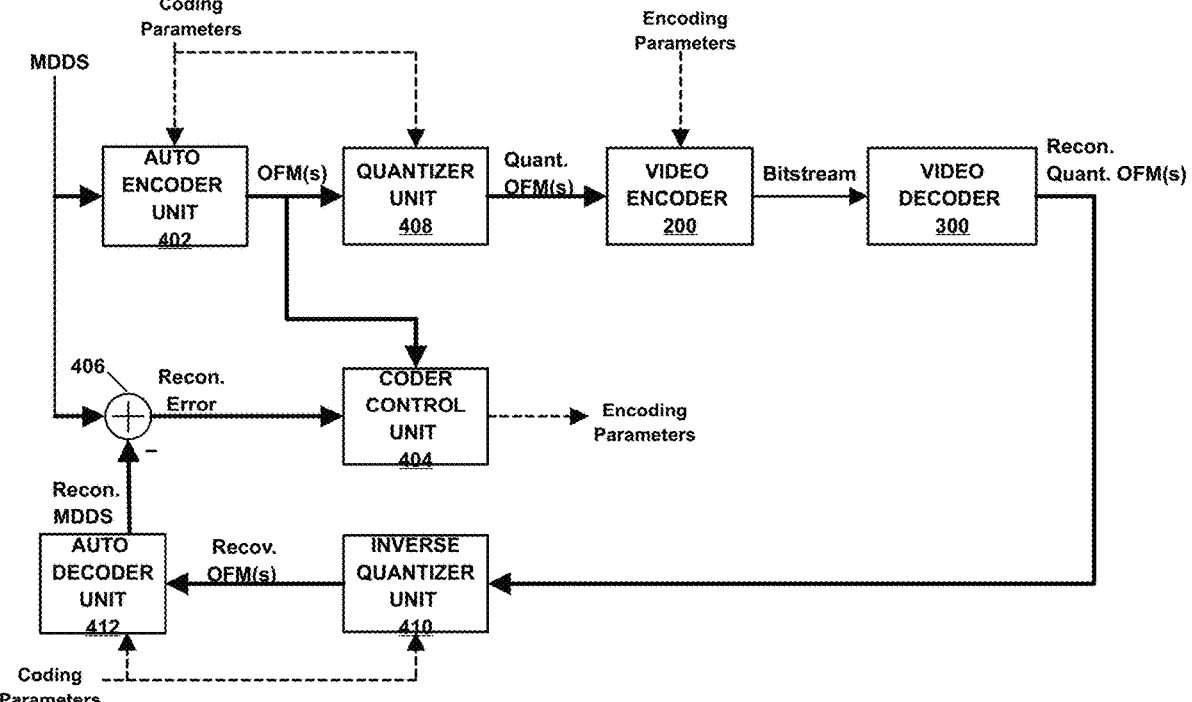
FIG. 9 is an example of a coding system that may encode a multi-dimensional data set in accordance with one or more techniques of this disclosure.

FIG. 9 is an example of a coding system that may encode a multi-dimensional data set in accordance with one or more techniques of this disclosure. The system in FIG. 9 is similar to the system illustrated in FIG. 8, and also includes quantizer unit 408, inverse quantizer unit 410, and autodecoder unit 412. As illustrated in FIG. 9, quantizer unit 408 receives the one or more output feature maps corresponding to the video data and quantizes the output feature maps. As described above, quantizing may include reducing bit-depth such that the amplitude range of the quantized OFM values is the same as input video data. As illustrated in FIG. 9, video encoder 200 receives the quantized output feature maps and encodes the quantized output feature maps based on the encoding parameters according to a typical video coding standard as described above and outputs a bitstream. Video decoder 300 receives the bitstream and reconstructs the quantized output feature maps according to a typical video coding standard as described above. It should be noted that although, not shown in FIG. 9, in some examples, additional processing may be performed on the quantized OFMs for purposes of coding the data according to a video coding standard. That is, in some examples, the data may be re-arranged, scaled, etc. Further, a reciprocal process may be performed on the reconstructed quantized OFMs. Inverse quantizer unit 410 receives the recovered quantized output feature maps and performs an inverse quantization and autodecoder unit 412 performs autodecoding. That is, inverse quantizer unit 410 and autodecoder unit 412 may operate in a manner similar to that described above with respect to FIG. 7B. In this manner, in the system illustrated in FIG. 9, the bitstream output video encoder 200 is an encoded down-sampled representation of input video data and video decoder, inverse quantizer unit 410, and autodecoder unit 412 reconstruct the input video data from the bitstream. Further, as illustrated in FIG. 9, in manner similar to that described above with respect to FIG. 8, coder control unit 404 may determine a rate-distortion for quantized output feature maps encoded using a particular set of encoding parameters and video data having particular OFMs. That is, coder control unit 404 may optimize the encoding of a down-sampled representation of video data. Further, coder control unit 404 may optimize the down-sampling of input video data. That is, for example, according to the techniques herein, coder control unit 404 may determine which types of video data (e.g., highly detailed images vs. low detail images (or regions thereof)) are more or less sensitive to a reconstruct error as a result of down-sampling.

Figure 10:
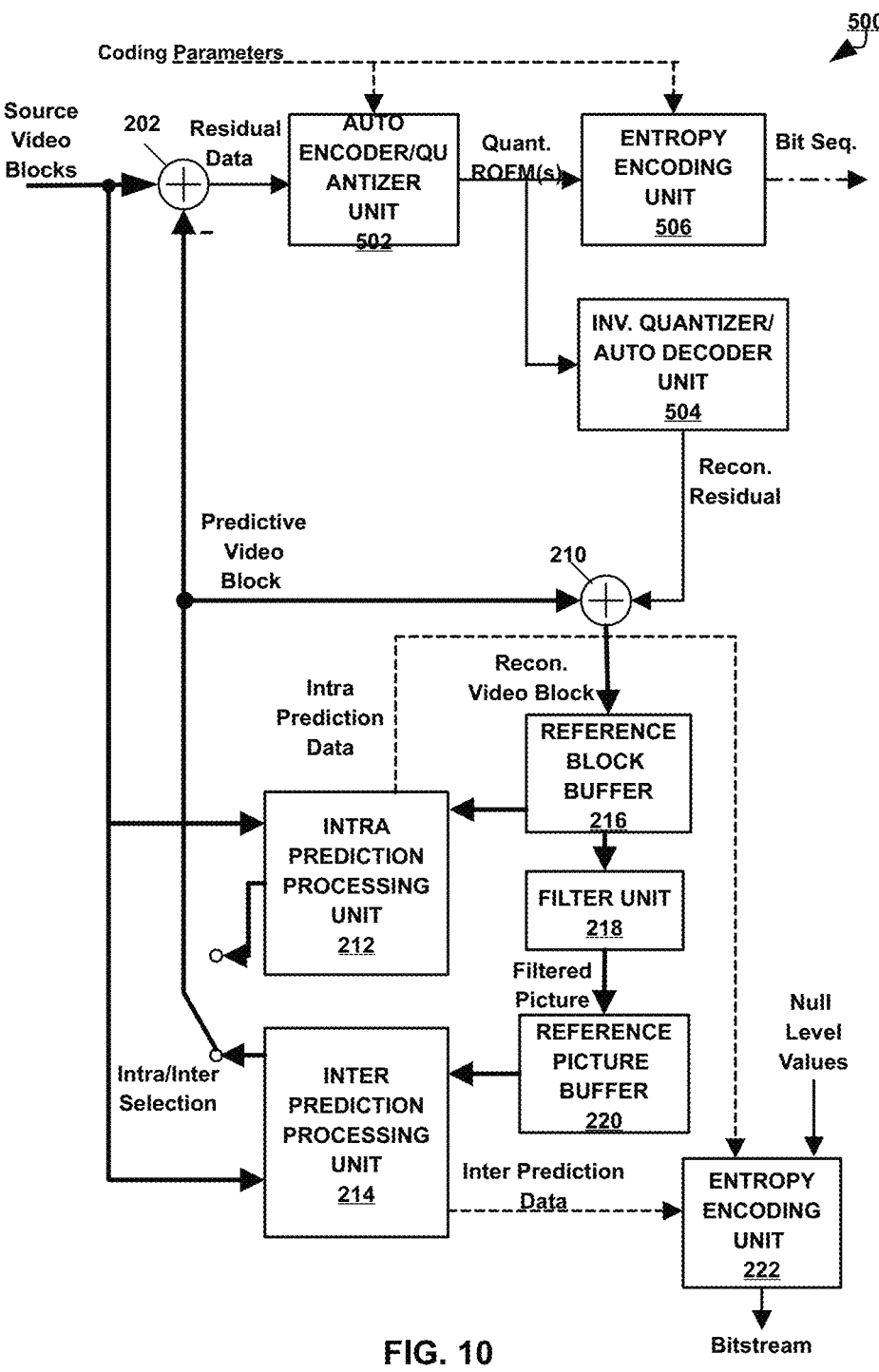
FIG. 10 is a block diagram illustrating an example of video encoder that may be configured to encode video data in according to one or more techniques of this disclosure.

As described above, with respect to FIG. 5, in the case of a typical video encoder, residual data may be encoded in a bitstream as level values. It should be noted that similar to input video data, residual data is an example of a multiple dimensional data set. Thus, in one example, according to the techniques herein, residual data (e.g., pixel domain residual data) may be encoded using autoencoding techniques. FIG. 10 is a block diagram illustrating an example of a video encoder that may be configured to encode video data according to techniques described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations. As illustrated in FIG. 10, video encoder 500 receives source video blocks and outputs a bitstream and similar to video encoder 200 in that includes summer 202, summer 210, intra prediction processing unit 212, inter prediction processing unit 214, reference block buffer 216, filter unit 218, reference picture buffer 220, and entropy encoding unit 222. Thus, video encoder 500 may perform intra prediction coding and inter prediction coding of picture areas in manner similar to that described above with respect to video encoder 200 receives source video blocks.

As illustrated in FIG. 10, video encoder 500 includes, autoencoder/quantizer unit 502, inverse quantizer and auto-decoder unit 504, and entropy encoding unit 506. As illustrated in FIG. 10, autoencoder/quantizer unit 502 receives residual data and output quantized residual output feature map(s) (ROFM(s)). That is, autoencoder/quantizer unit 502 may perform autoencoding according to techniques described herein. For example, in a manner similar to that described above with respect to FIG. 7A. As illustrated in FIG. 10, inverse quantizer and autodecoder unit 504 receives quantized residual output feature map(s) (ROFM(s)) and outputs reconstructed residual data. That is, auto inverse quantizer and autodecoder unit 504 may perform auto decoding according to techniques described herein. For example, in a manner similar to that described above with respect to FIG. 7B. In this manner, video encoder 200 illustrated FIG. 5 and video encoder 500 illustrated FIG. 10 have encode/decode loops for reconstructing residual data which is then added to predictive video blocks for subsequent coding. As illustrated in FIG. 10, entropy encoding unit 506 receives quantized residual output feature map(s) and outputs a bit sequence. That is, entropy encoding unit 506 may perform entropy encoding according to entropy encoding techniques described herein. As further, illustrated in FIG. 10, coding parameters entropy encoding unit 222 receives null level values. That is, because video encoder 500 outputs encoded residual data as a bit sequence and a video decoder (e.g., video decoder 500 illustrated in FIG. 11), can derive residual data from the bit sequence, in some cases, residual data may not be derived from a typical video coding standard compliant bitstream. For example, the bitstream generated from video encoder 500 may set coded block flags (e.g., cbf_luma, cbf_cb, and cbf_cr in ITU-T H.265) to zero to indicate that there are no transform coefficient level values not equal to 0. It should be noted that although, in the example illustrated in FIG. 10, transform coefficient generator 204, coefficient quantization unit 206, inverse quantization and transform coefficient processing unit 208 are not included in some example, video encoder 500 may be configured to additional/alternatively encode residual data using one or more of the techniques described above. That is, the type of encoding used to residual data may be selectively applied, e.g., on a sequence-by-sequence, a picture-by-picture, a slice-by-slice level, and/or a component-by-component basis. As further, illustrated in FIG. 10, autoencoder/quantizer unit 502 and entropy encoding unit 506 are controlled by coding parameters. That is, coder control unit (a coder control unit 404 described in FIG. 8 and FIG. 9) may be used in conjunction with video encoder 400. That is, video encoder 500 may be used in a system where rate-distortion is optimized based on techniques described herein.

Figure 11:
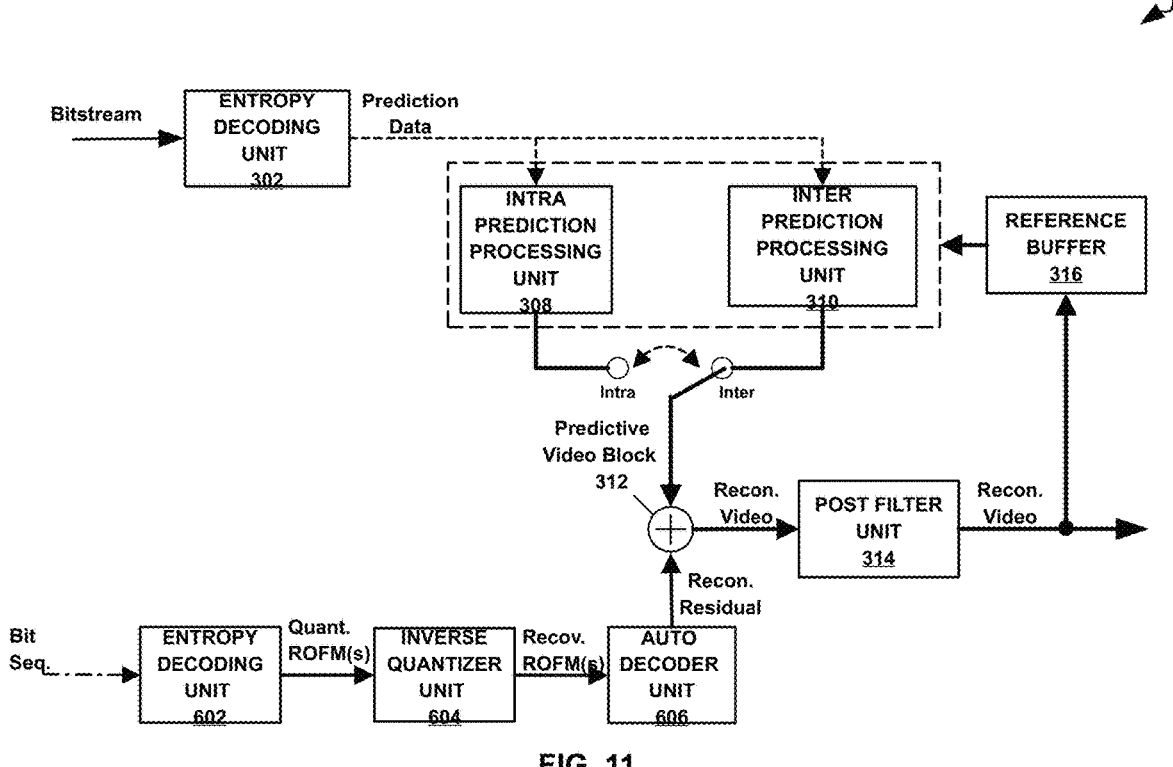
FIG. 11 is a block diagram illustrating an example of video decoder that may be configured to decode video data in according to one or more techniques of this disclosure.

FIG. 11 is a block diagram illustrating an example of a video decoder that may be configured to decode video data according to techniques described herein. As illustrated in FIG. 11, video decoder 600 receives an entropy encoded bitstream and a bit sequence and outputs reconstructed video. Similar to video decoder 300 illustrated in FIG. 6, video decoder 600 includes an entropy decoding unit 302, intra prediction processing unit 308, inter prediction processing unit 310, summer 312, post filter unit 314, and reference buffer 316. Thus, video decoder 600 may be configured to derive a predictive video block from a compliant bitstream and add the predictive video block to a reconstructed residual to generate reconstructed video in a manner similar to that described above with respect to FIG. 6. As further illustrated in the example illustrated in FIG. 6, video decoder 600 includes entropy decoding unit 602. Entropy decoding unit 602 may be configured to decode quantized residual output feature maps from a bit sequence according to a process reciprocal to an entropy encoding process. That is, entropy decoding unit 302 may be configured to perform entropy decoding according to entropy encoding techniques performed by entropy encoding unit 506 described above. As illustrated in FIG. 11, inverse quantizer unit 604 receives quantized residual output feature map(s) and outputs recovered residual output feature map(s) to autodecoder unit 606. Autodecoder unit 606 outputs reconstructed residual data. Thus, inverse quantizer unit 604 and autodecoder unit 606 operate in a similar manner to inverse quantization and autodecoder unit 504 described above. That is, inverse quantizer unit 604 and autodecoder unit 606 may perform autodecoding according to techniques described herein. Thus, in the example illustrated in FIG. 11, video decoder 600 may be configured to decode video data according to techniques described herein. It should be noted that as described in further detail below, predictive coding may be used on data other than video data. Thus, in one example, video decoder 600 may decode non-video MDDS from a compliant bitstream. For example, video decoder 600 may decode data from machine consumption. Similarly, video encoder 600 may decode non-video MDDS having a compatible input structure format. That is, for example, source video may undergoes some pre-processing and be converted to non-video MDDS. To summarize, a typical video encoder and decoder may be agnostic as to whether the data being coded is actually video data (e.g., human consumable video data).

As described above, predictive video coding techniques (i.e., intra prediction and inter prediction) generate a prediction for a current video block from stored reconstructed reference video data. As further described above, in one example, according to the techniques herein, a downsampled representation of video data, which is an output feature map, may be coded according to a predictive video coding techniques. Thus, predictive coding techniques utilized for coding video data may generally be applied to output feature maps. That is, in one example, according to the techniques herein output features maps (e.g., output features maps corresponding to video data) may be predictively coded utilizing predictive video coding techniques. Further, in some examples, according to the techniques herein, the corresponding residual data (i.e., e.g., the difference in a current region of an OFM and a prediction) may be encoded using autoencoding techniques. Thus, in one example, according to the techniques herein a multi-dimensional data set may be autoencoded, the resulting output features maps may be predictively coded, and the residual data corresponding output features maps may be auto encoded.

Figure 12:
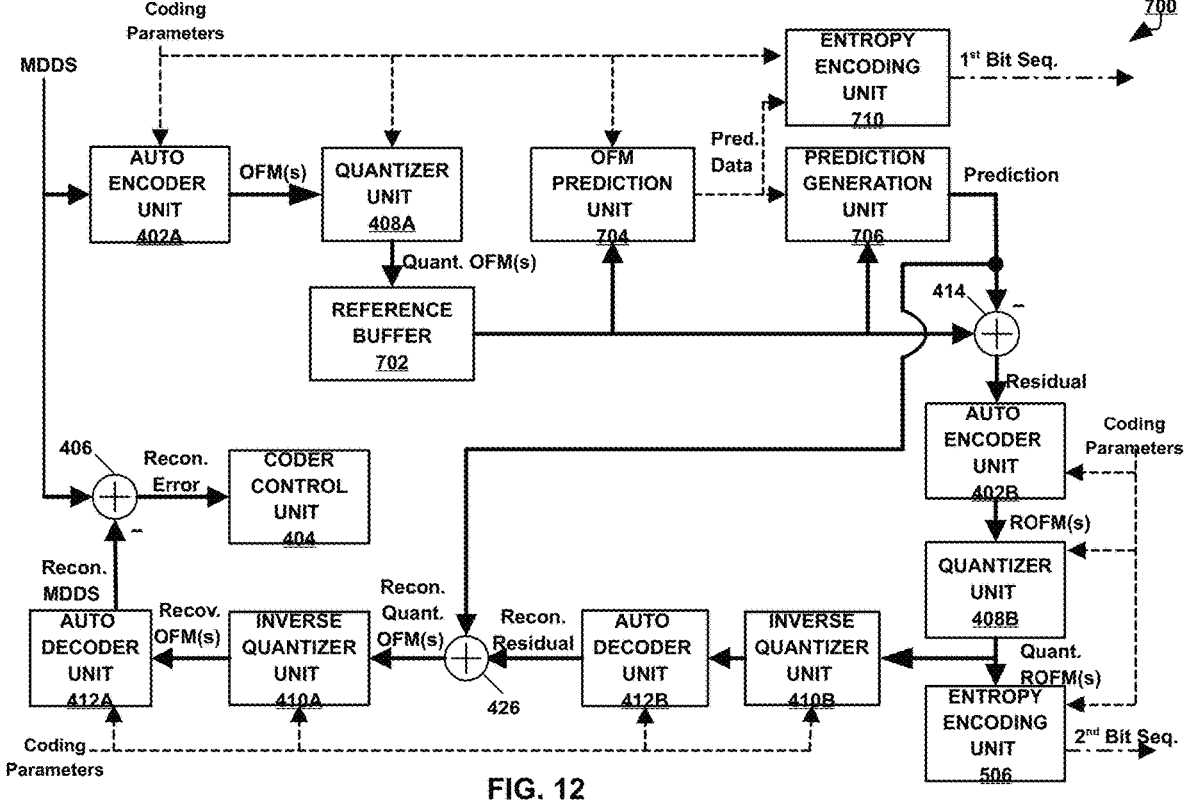
FIG. 12 is a block diagram illustrating an example of a compression engine that may be configured to encode a multi-dimensional data set in accordance with one or more techniques of this disclosure.

FIG. 12 is a block diagram illustrating an example of a compression engine that may be configured to encode a multi-dimensional data set in accordance with one or more techniques of this disclosure. It should be noted that although example compression engine 700 is illustrated as having distinct functional blocks, such an illustration is for descriptive purposes and does not limit compression engine 700 and/or sub-components thereof to a particular hardware or software architecture. Functions of compression engine 700 may be realized using any combination of hardware, firmware, and/or software implementations. In the example illustrated in FIG. 12, compression engine 700 includes autoencoder units 402A and 402B, coder control unit 404, summer 406, quantizer units 408A and 408B, inverse quantizer units 410A and 410B, autodecoder units 412A and 412B, summer 414, and entropy encoding unit 506. As further illustrated in FIG. 12, compression engine 700 includes reference buffer 702, OFM prediction unit 704, prediction generation unit 706 and entropy encoding unit 710. As illustrated in FIG. 12, compression engine 700 receives an MDDS and outputs a first bit sequence and a second bit sequence.

Autoencoder units 402A and 402B and quantizer units 408A and 408B are configured to operate in manner similar to autoencoder unit 402 and quantizer unit 408 described above with respect to FIG. 9. That is, autoencoder units 402A and 402B and quantizer units 408A and 408B are configured to receive an MDDS and output quantized OFMs. In particular, in the example illustrated in FIG. 12, autoencoder unit 402A and quantizer unit 408A receive a source MDDS and output quantized OFMs and autoencoder unit 402B and quantizer unit 408B receive residual data, which as described above, is an MDDS, and output quantized OFMs. Further, inverse quantizer units 410A and 410B and autodecoder units 412A and 412B are configured to operate in manner similar to inverse quantizer unit 410 and autodecoder unit 412 described above with respect to FIG. 9. That is, inverse quantizer units 410A and 410B and autodecoder units 412A and 412B are configured to receive quantized output feature maps, perform inverse quantization, and auto decoding to generate a reconstructed data set. In particular, in the example illustrated in FIG. 12, inverse quantizer unit 410B and autodecoder unit 412B received quantized residual output feature map(s) and output reconstructed residual data as part of an encode/decode loop. As illustrated in FIG. 12 at summer 426 the reconstructed residual data is added to a prediction video blocks for subsequent coding. As described in further detail below, the prediction is generated by prediction generation unit and is a quantized OFMs. As illustrated in FIG. 12, the output of summer 426 is reconstructed quantized OFM(s) and inverse quantizer units 410A and 410B receive the reconstructed quantized OFM(s) and output reconstructed MDDS as part of an encode/decode loop. That is, as illustrated in FIG. 12, summer 406 provides a reconstruction error which may be evaluated by coder control unit 404, in a manner similar to that described above. Thus, compression engine 700 is similar to encoders and systems described above, in that rate-distortion is optimized based on a reconstruction error. As illustrated in FIG. 12, entropy encoding unit 506 receives quantized residual output feature map(s) and outputs a bit sequence. In this manner, entropy encoding unit 506 operations in a manner similar to entropy encoding unit 506 described above with respect to FIG. 10.

As described above, output features maps may be predictively coded. Referring again to FIG. 12, reference buffer 702, OFM prediction unit 704, and prediction generation unit 706 represent components of compression engine 700 configured to predictively code output features maps. That is, output features maps may be stored in reference buffer 702. OFM prediction unit 704 may be configured to analyze a current OFM and a OFM stored to reference buffer 702 and generate a prediction data. That is, for example, OFM prediction unit 704 may treat OFMs similar to the way pictures are treated in a typical video coding and select a reference OFM and motion information for a current OFM. In the example, illustrated in FIG. 12, prediction generation unit 706 received the prediction data and generates a prediction (e.g., retrieves an area of an OFM) from OFM data stored to reference buffer 702. It should be noted that in FIG. 12, OFM prediction unit 704 is illustrated as receiving coding parameters. In this case, coder control unit 404 may control how prediction data is generated, e.g., based on a rate-distortion analysis. For example, OFM data may be particularly sensitive to various types of artifacts that are minor with respect to video data and thus prediction modes associated with such artifacts may be disabled. Finally, as illustrated in FIG. 12 entropy encoding unit 710 receives coding parameters and prediction data and outputs a bit sequence. That is, entropy encoding unit 710 may be configured to perform entropy encoding techniques described herein. It should be noted that although not shown in FIG. 12, the first bit sequence and the second bit sequence may be multiplexed (e.g., before or after entropy encoding) to form a single bitstream.

Figure 13:
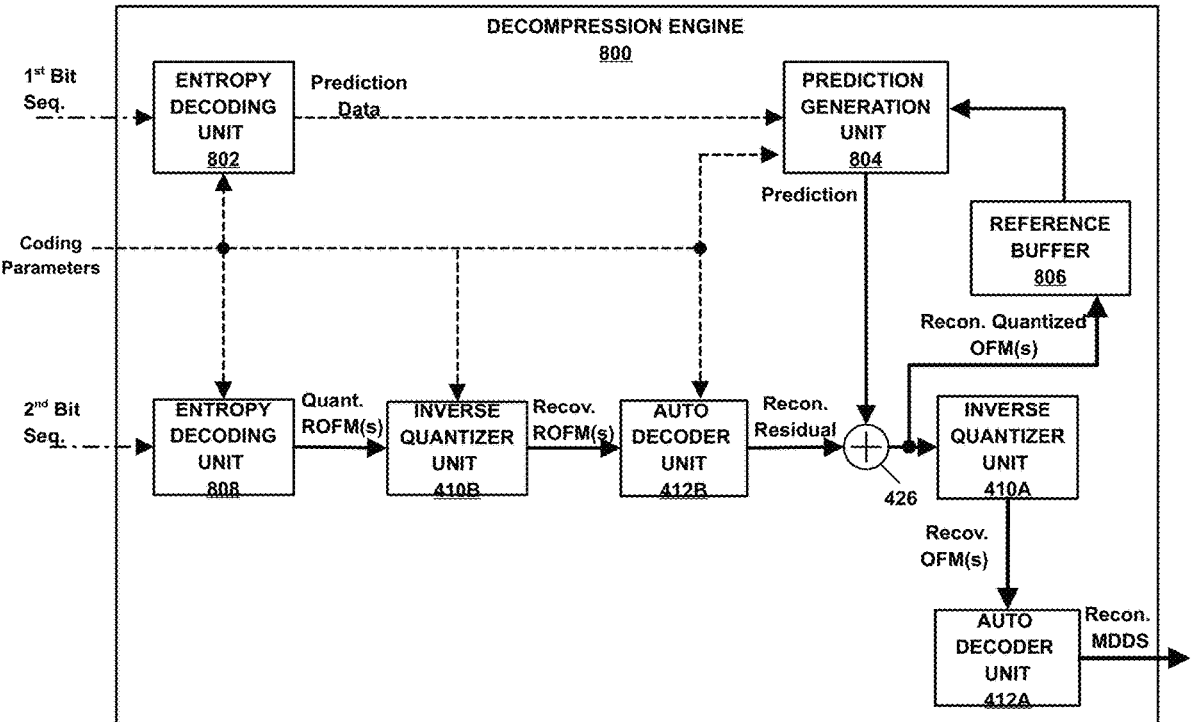
FIG. 13 is a block diagram illustrating an example of a decompression engine that may be configured to decode a multi-dimensional data set in accordance with one or more techniques of this disclosure.

FIG. 13 is a block diagram illustrating an example of a decompression engine that may be configured to decode a multi-dimensional data set in accordance with one or more techniques of this disclosure. As illustrated in FIG. 13, decompression engine 800 receives an entropy encoded first bit sequence, the second bit sequence, and coding parameters and outputs a reconstructed MDDS. That is, decompression engine 800 may operate in a reciprocal manner to compression engine 700. As illustrated in FIG. 13, decompression engine 800 includes inverse quantizer units 410A and 410B, autodecoder units 412A and 412B, and summer 426, each of which may be configured to operate in a similar manner to like numbered components described above with respect to FIG. 12. As further, illustrated in FIG. 13, decompression engine 800 includes entropy decoding unit 802, prediction generation unit 804, reference buffer 806, and entropy decoding unit 808. As illustrated in FIG. 13, entropy decoding unit 802 and entropy decoding unit 808 receive respective bit sequences and output respective data. That is, entropy decoding unit 802 and entropy decoding unit 808 may operate in a reciprocal manner to entropy encoding unit 710 and entropy encoding unit 506 described above with respect to FIG. 12. As illustrated in FIG. 13 reference buffer 806 stores reconstructed quantized OFM and prediction generation unit 804 receives prediction data and coding parameters generates a prediction. That is, prediction generation unit 804 and reference buffer 806 may operate in manner similar to prediction generation unit 706 and reference buffer 702 described above with respect to FIG. 12. Thus, decompression engine 800 may be configured to decode encoded MDDS data according to techniques described herein.

It should be noted that in the examples illustrated above, in FIG. 8, FIG. 9 and FIG. 12, each coder control unit 404 is illustrated as receiving a reconstruction error. In some examples, a coder control unit may not receive a reconstruction error. That is, in some examples, full decoding may not occur at an encoder. For example, referring to FIG. 8, in one example, video decoder 300 and summer 406 (i.e., decoding loop) and coder control unit 404 may simply receive the OFM(s) to determine encoding parameters.

As described above, for example, with respect to FIG. 7A, during autoencoding, an arbitrary padding operation may be used to increase the size of an input data set prior to convolution. Further, it should be noted, as illustrated in FIG. 7A, a convolution at an autoencoder may down-sample an input data set. In the example illustrated in FIG. 7A, for a unit stride, the 6×6 input data set is down-sampled to a 4×4 output feature map. As described above, in some cases, for particular kernel size and stride function, the kernel may lie outside of the support region. In some cases, the output at such a position is not valid. This is the case for the example illustrated in FIG. 7A and corresponds to the first entry in Table 1.

TABLE 1

| | | | |
|---|---|---|---|
| Output Size when kernel outside support not a valid position | | | |
| Stride | Input Size along Stride dimension | Kernel Size along Stride dimension | Output Size along Stride dimension |
| 1 | 6 | 3 | 4 |
| 1 | 6 | 4 | 3 |
| 1 | 6 | 5 | 2 |
| 2 | 6 | 2 | 3 |
| 2 | 6 | 4 | 2 |
| 3 | 6 | 3 | 2 |
| 1 | 8 | 5 | 4 |
| 1 | 8 | 6 | 3 |
| 1 | 8 | 7 | 2 |
| 2 | 8 | 4 | 3 |
| 4 | 8 | 4 | 2 |

Table 1 illustrates examples of combinations of a stride, input size, and kernel size along dimension that lead to a particular output size along a dimension in a case where the kernel being outside of the support is not a valid position. As illustrated in Table 1, although each of combination of stride, input size, and kernel size is unique, output sizes are not. That is, there may be several unique combinations that generate the same output size. Further, as described above, in some cases a kernel being outside of the support region may not be a valid position. It should be noted that Table 1 may be summarized according to the following equation, which is generally applicable for determining an output size:

$$O = \frac{I - (K-1) - 1}{S} + 1$$

Where, O is the output size,
I is the input size,
K is the kernel size, and
S is the stride, and the division is integer division.

Thus, for an arbitrary sized OFM received at an autodecoder, in some cases, a corresponding sized input array cannot be unambiguously derived without knowing particular parameters. In some cases, it may be useful to store defined parameters at the autodecoder and in some cases, it may be useful to vary the parameters (e.g., based on properties of the input). In the case where the parameters are capable of being varied, it may be necessary to signal parameters to the autodecoder. For example, although each picture in a GOP may have the same resolution, in some cases in may be beneficial to vary the input size, kernel size and/or stride on a picture-by-picture and/or region-by-region basis and as such, potentially produce a different sized OFM for each picture in a GOP. That is, input size may be encoder specific and may not be defined in a standard and as such, may be different for different applications even if the source is the same. Further, as described above, in the case of a GOP, a discrete convolution may be performed in a three-dimensional space, e.g., temporal down-sampling. It may be useful to vary the size of temporal dimension, e.g., based on a number of consecutive pictures that are similar. As described above, convolution at an autoencoder may include multi-staged convolutions. For example, for an N×N input, convolution at a first stage may produce a N/2×N/2 OFM, convolution at a second stage may produce a N/4×N/4 OFM from the N/2×N/2 OFM, and so on. In some cases, padding information, a kernel size, and/or a stride function may be different at each stage. Further, in some cases, a padding stage may precede multiple convolution stages (e.g., padding 1, convolution 1, convolution 2, padding 2, convolution 3, convolution 4, etc.). Thus, there are several ways in which the relationship between an input size and an output size may be complex. This disclosure describes techniques for signaling parameters to an autodecoder which allow an autodecoder to recover appropriately sized input data from an arbitrary sized received OFM.

As described above, it may be useful to store parameters at the autodecoder. For example, referring to Table 1, stride and kernel size information (e.g., 1, and 3) may be stored at an autodecoder, and input size may be signaled. However, as described above, and illustrated in FIG. 7A, an input may have been padded to arrive a particular size. That is, referring to the example illustrated in Table 1, the input size of 6 is not unambiguous. That is, for example, an initial input size of 4 may have been padded by 2 to arrive at 6 or an initial input size of 3 may have been padded by 3 to arrive at 6. That is, I in the equation above may be the sum of an initial input size, $I_0$, and padding, P. In this case, the equation may be as follows:

$$O = \frac{(I_0 + P) - (K-1) - 1}{S} + 1$$

Where, O is the output size,
$I_0$ is an initial input size,
P is a padding size,
K is the kernel size, and
S is the stride.

As described above, an OFM may be generated through multiple-stages of padding and convolution, that is, an instance of O as defined in the equation above may occur at the output of every convolution stage. In some examples, in may be sufficient to determine an initial input size from a received output. In some examples, it may be useful/necessary to determine one or more intermediate input sizes and/or output sizes. In one example, according to the techniques herein, regardless of how a received OFM is generated, signaling the padding size and/or type may be used to recover appropriately sized data at an autodecoder.

Referring to the equation above, in one example, according to the techniques herein, in order to recover an initial input size, $I_0$ from received data have output size, O, one or more parameters, $I_0$, P, K, and/or S may be signaled. However, signaling $I_0$, P, K, and/or S may require significant signaling overhead. Thus, according to the techniques herein, signaling may be simplified by (1) setting one or more of the parameters to default values, and/or (2) default ranges, e.g., based on defined constraints/relationships between the parameters.

In one example, according to the techniques herein, K and S may be known/defined and similarly the operation of an autodecoder may be well-defined and known to an autoencoder. That is, the autoencoder knows the size of the input (e.g., the OFM) received at the decoder. This information along with the known K and S of convolution/convolution-transpose stages can be used to determine what the data set size will be at a particular location of the autodecoder. In one example, according to the techniques herein, based on the determined data set size at an autodecoder stage, an auto-encoder can signal information that will either pad or crop the tensor at that location to match the size of $I_0$. That is, for example, P may be signaled in such a manner that $I_0$ may be derived at an autodecoder from received data have output size, O, defined K and S, and the received P. That is, $I_0$ may be derived from a signaled P value. As described above, an autodecoder can determine what the data set size will be at a particular location of the autodecoder. In one example, according to the techniques herein the autoencoder may signal how the data set size should be manipulated to arrive at a desired data size, e.g., crop or pad two leftmost columns to arrive at $I_0$. It should be noted that in some examples, cropping a value may include setting a value to zero, e.g., implemented as a multiplication by 0.

In one example, according to the techniques herein, an autoencoder may be configured to operate according to a specific down-sampling factor. That is, an input dimension may be down-sampled according to a down-sampling ratio. Further, the size of an input data at a convolution may be limited. Table 2 illustrates an example, where a convolution stage receives an input dimension size of 16, 8, or 4, and down-samples by a factor of 2 to generate respective output dimension size of 8, 4, or 2. As illustrated in Table 2, if an initial input size is not one of 16, 8, or 4 it is padded to attain the appropriate size. Thus, as illustrated in Table 2, according to the techniques herein, for a received O, $I_0$ may be determined from a signaled Pad Size value. For example, if O is 8, and the signaled Pad size corresponds to 4, the initial input size of 12 can be unambiguously determined.

TABLE 2

| Down-sampling Factor of 2 | | | | |
|---|---|---|---|---|
| Initial Input Size, $I_0$, along Stride dimension | Pad Size | Bit Sequence | $I_0$ + Pad Size | Output Size along Stride dimension (Conv($I_0$ + Pad)) |
| 16 | 0 | 0 | 16 | 8 |
| 12 | 4 | 10 | 16 | 8 |
| 10 | 6 | 11 | 16 | 8 |
| 8 | 0 | 0 | 8 | 4 |
| 6 | 2 | 1 | 8 | 4 |
| 4 | 0 | 0 | 4 | 2 |
| 2 | 2 | 1 | 4 | 2 |

As further illustrated in Table 2, in one example, according to the techniques herein, the number of bits used to signal a padding may have a particular binarization based on the output size. That is, for example, for the case of outsize size equal to 8, the binarization of the bit sequence indicates one of 0, 4, or 6.

It should be noted that in the example illustrated in Table 2, for an output size the example bit sequences provide unique values of $I_0$. That is, for example, if O is 8, and the received bit sequence is 10, the initial input size of 12 can be unambiguously determined. In this manner, in one example, according to the techniques herein, a padding may be derived from a signaled $I_0$ value. Finally, it should be noted the in the example illustrated in Table 2, the padding type may be predetermined, e.g., symmetric extension along a predetermined side of the dimension.

As described above, different values may be used for padding. For example, padding value may be predetermined (e.g., 0). In some cases, according to the techniques herein, a pad value may be signaled. For example, by signaling a value directly, e.g., using an 8-bit value to signal a value in the range of 0 . . . 255. Further, as described above, different types of padding functions may be defined. For example, a padding may include interlacing 0's or performing a defined extension. Table 3 illustrates an example, where for the allowed convolution inputs and corresponding output sizes in Table 2, multiple types of padding are allowed, i.e., interlace 0's or symmetric extension. That is, in the example illustrated in Table 3, a second bit sequence (of 1 bit) may be used to indicate one of interlacing 0's or symmetric extension. In other examples, other types of padding may be signaled. Further, in one example, a flag may indicate the presence of a signaled padding value. For example, referring to Table 3, in one example, if bit sequence 2 is 0, this could indicate an 8-bit value used to signal a value in the range of 0 . . . 255 is present.

TABLE 3

| Initial Input Size, | | | Bit Sequence$_2$ | |
|---|---|---|---|---|
| $I_0$, along Stride dimension | Pad Size | Bit Sequence$_1$ | 0 | 1 |
| | | | Pad Value/Type | |
| 16 | 0 | 0 | N/A | N/A |
| 12 | 4 | 10 | Interlace 0's | Symmetric Ext. |
| 10 | 6 | 11 | Interlace 0's | Symmetric Ext. |
| 8 | 0 | 0 | Interlace 0's | Symmetric Ext. |
| 6 | 2 | 1 | Interlace 0's | Symmetric Ext. |
| 4 | 0 | 0 | Interlace 0's | Symmetric Ext. |
| 2 | 2 | 1 | Interlace 0's | Symmetric Ext. |

As described above, there may be different types of padding. Further, it should be noted that padding may be asymmetric about a dimension. That is, for example, in a vertical direction the size of a padding above may be different than the size of the padding below. Table 4 illustrates an example, where for the allowed convolution inputs and corresponding output sizes in Table 2, multiple types of asymmetric padding about a dimension are allowed. It should be noted that although Table 4 uses the tens above and below for a vertical case, in other dimensions (e.g., horizontal) other appropriate terms could be used (e.g., left and right). It should be noted that in the example illustrated in Table 4, combinations of above and below padding are limited. In one example, according to the techniques herein, a padding size about a dimension may be signaled directly. For example, for $I_0$=12 in Table 4, in one example 0, 1, 2, 3, or 4 may be signaled as an above padding. It should be noted that in this case, a below padding may be derived from an above padding (i.e., Below padding=Total padding–Above padding).

TABLE 4

| Initial Input Size, $I_0$, along Stride dimension | Pad | Pad Type | Bit Sequence |
|---|---|---|---|
| 16 | 0 | N/A | 0 |
| 12 | 4 | Above 4, Below 0 | 1000 |
| 12 | 4 | Above 2, Below 2 | 1001 |
| 12 | 4 | Above 0, Below 4 | 1010 |
| 10 | 6 | Above 6, Below 0 | 1011 |
| 10 | 6 | Above 4, Below 2 | 1100 |
| 10 | 6 | Above 2, Below 4 | 1101 |
| 10 | 6 | Above 0, Below 6 | 1111 |

It should be noted that Tables 2-4 describe signaling padding at a single dimension. In one example, according to the techniques herein, the signaling may be used for each dimension. Further, in one example, according to the techniques herein signaling may be provided that indicates padding information for multiple dimensions. As described above, in one example, a convolution stage may operate according to a down-sampling factor and sets of appropriate inputs and padding may be achieved to attain an input appropriate size. It should be noted that in some examples, a padding function may be used to pad an input data set such that it has dimensions with useful properties for convolution. For example, in one example, it may be useful to be able to perform convolution on data having a size that is a multiple of 3 in each dimension. For example, input data having $h_i=160$ and $w_i=224$ may be padded to $h_1=162$, $w_1=225$ prior to convolution. It should be noted that in this case, performing a convolution that down-samples by 3 in each spatial dimension results in a $h_o=54$ and $w_o=75$, i.e., integer values. Table 5 illustrates an example of how various size input data $I_0$ may be padded to a multiple of 3 and a corresponding output size.

TABLE 5

| Down-sampling Factor of 3 | | | | |
|---|---|---|---|---|
| Initial Input Size, $I_0$, along Stride dimension | Pad Size | Bit Sequence | $I_0$ + Pad Size | Output Size along Stride dimension (Conv($I_0$ + Pad)) |
| 16 | 2 | Not present | 18 | 6 |
| 12 | 0 | 0 | 12 | 4 |
| 10 | 2 | 1 | 12 | 4 |
| 8 | 1 | N/A | 9 | 3 |
| 6 | 0 | 0 | 6 | 2 |
| 4 | 2 | 1 | 6 | 2 |
| 2 | 1 | N/A | 1 | 1 |

Figure 14:
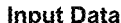
FIG. 14 is a conceptual diagram illustrating examples of coding a block of video data in accordance with autoencoding techniques which may be utilized with one or more techniques of this disclosure.

As described above, in one example, according to the techniques herein, signaling may be provided that indicates padding information for multiple dimensions. FIG. 14 illustrates an example, where one of four possible paddings may be used to pad a 4×4 input to a 6×6 size for convolution. That is, FIG. 14 corresponds to initial $I_0=4$ in Table 5, in each of a height and width dimension. Table 6 illustrates an example, based on the example illustrated in Table 5 and FIG. 14 of signaling one of five possible cases for a received 2×2 output size. That is, in the example illustrated in Table 6 $I_0$ is one of 6×6 or a 4×4 padded according to one of four defined type and the unique bit sequence received by an autodecoder may be used to determine one of the five possible cases.

TABLE 6

| Initial Input Size, $I_0$, w × h | Pad Type | Bit Sequence | Output Size |
|---|---|---|---|
| 6 × 6 | None | 0 | 2 × 2 |
| 4 × 4 | $Type_1$ | 10 | 2 × 2 |
| 4 × 4 | $Type_2$ | 110 | 2 × 2 |
| 4 × 4 | $Type_3$ | 1110 | 2 × 2 |
| 4 × 4 | $Type_4$ | 1111 | 2 × 2 |

In this manner, according to the techniques herein, in the case of two-dimensional discrete convolution, for initial input data having a width, $w_i$, and height, $h_i$, padded according to arbitrary padding function to generate input data having a width, $w_{i+1}$, and height, $h_{i+1}$, for generating an output feature map having a width, w, and height, h, signaling is provided such that $w_o$ and $h_o$ may be recovered at an autodecoder. As described above, in some examples, it may be useful/necessary to determine one or more intermediate input sizes and/or output sizes. In one example, according to the techniques herein, the example signaling techniques provide above may be used at any stage and/or combinations of groups of stages (e.g., padding 1, convolution 1, convolution 2, Signaling 1, padding 2, convolution 3, convolution 4, Signaling 2, etc.).

As described above, according to the techniques herein, K and S may be known/defined at an autodecoder and P may be signaled in such a manner the $I_0$ (or P) may be derived from received data have output size, O, defined K and S, and a received P (or $I_0$) value. In one example, according to the techniques herein, in a general case, horizontal and vertical padding sizes wpad and hpad, for a padding operation performed prior to a group of down-samplings may be defined such that, for each corresponding down-sampling step i within the group, the following is satisfied:

$$[w_i-(k_{xi}-1)-1] \text{ is a positive integer (i.e. integer greater than 0) multiple of } s_{xi}, \text{ and}$$

$$[h_i-(k_{yi}-1)-1] \text{ is a positive integer (i.e. integer greater than 0) multiple of } s_{yi} \quad \text{Conditions:}$$

where, $w_i$, $h_i$ is the width (x-direction) and height (y-direction), respectively, of input tensor at down-sampling step i $k_{xi}$, $k_{yi}$ is the kernel size in x-direction and y-direction, respectively, at down-sampling step i $s_{xi}$, $s_{yi}$ is the stride in x-direction and y-direction, respectively, at down-sampling step i In one example, the derive padding sizes wpad and hpad, for a padding operation performed prior to a group of down-samplings, may the smallest integer values greater than or equal to 0, such that, for each corresponding down-sampling step i within the group, the above conditions is satisfied. In one example, according to the techniques herein, signal may be defined based on the conditions being satisfied. That is, in a manner similar to limiting inputs and possible output at convolution as described above.

In this manner, data encoder 106 represents an example of a device configured to pad an initially sized data set to a specified input data set size, generate an output data set corresponding to the input data by performing a discrete convolution on the padded data set, and generating a signal providing information corresponding to the output data set and padding information.

In this manner, data decoder 124 represents an example of a device configured to receive an output data set, receive a signal providing information corresponding padding information, generate an input data set corresponding to the output data by performing a discrete convolution transpose on the output data set, and generate a reconstructed data set corresponding to an initially sized data set by performing an operation on the generated an input data based on the received padding information.

As described above, with respect to FIG. 7A, an OFM may be quantized and entropy encoded for further compression, where, for example, quantization may include a combination of numerous quantization techniques. As further described above, quantization may include setting an amplitude in an OFM to a specified quantized value, if the amplitude is within a specified range. For example, all amplitudes within the inclusive range 0 to 50 may be set to 0. As further described above, a process for deriving an amplitude from a received value may be signaled. For example, in the case above, a received value of 0 may correspond to a dequantized amplitude of 25. It should be noted that in some cases, a received value may be referred to as a quantization index.

As described above, with respect to convolution of a GOP, in some cases it may be beneficial to vary the input size, kernel size and/or stride on a picture-by-picture and/or region-by-region basis. Similarly, in one example, according to the techniques herein, it may be beneficial to vary the quantization on a picture-by-picture and/or region-by-region basis and more generally, vary quantization for different subsets of OFM(s) corresponding to a MDDS. It should be noted that as described above, a convolution may down-sample video in both the spatial and temporal dimensions. Thus, in some cases, a 2D OFM may correspond to down-sampled video in both the spatial and temporal dimensions. In this manner, quantization of the 2D OFM may be particularly effective at compressing video data.

In one example, according to the techniques herein, different quantizers (that is, quantization techniques and/or sets of quantization indices, etc.) may be used for different group(s) of spatially adjacent sets of values within an OFM. For example, referring to the 4×4 Output Feature Map in FIG. 7A, in one example, for each 2×2 region, a different quantizer may be used. It should be noted that in a typical case, a 2D OFM which is to be quantized may have a much larger size than 4×4 (e.g., 420×270, 225×162, 75×54, etc.). In one example, according to the techniques herein, a quantizer may be signaled for each region according to a predefined partitioning. For example, for a 420×270 OFM, a quantizer may be signaled for each 84×54 region. That is, for example, information for 25 quantizers may be signaled. In one example, the quantizers may be signaled in a raster scan order. Further, in one example, delta signaling may be used to signal information for quantizers. That is, for example, for a first region a base quantizer may be defined and/or signaled (e.g., a base set of dequantized values for quantization indices) and for each subsequent region, quantizer information may be signaled as difference values relative to the base quantizer (e.g., delta dequantized values). Further, it should be noted that there may be several ways in which a current quantizer is indicated. For example, in ITU-T H.265, a base quantizer is provided at each slice (e.g., according to default quantizer or a signaled quantizer) and delta values may be provided for each CTU in the slice (or CTUs in a slice forming a quantization group), where the delta values for a current CTU indicate a change with respect to the quantizer used for the previous CTU. According to the techniques herein, a similar mechanism may be employed for updated quantizers for regions of an OFM.

As described above, for example, with respect to FIG. 3, video data may be partitioned and the partitioning may be signaled according to a defined partition scheme (e.g., QT partition in ITU-T H.265) for purposes of generating a prediction. In one example, according to the techniques herein, an OFM may be partitioned and the partitioning may be signaled according to a defined partition scheme. That is, in one example, according to the techniques herein, quantization regions may be identified using a spatial partitioning (e.g., derived from a partitioning tree, derived from a tile-based partitioning of the spatial elements) and selected quantizers for each quantization region may be signaled according to a defined bit sequence. For example, a first signaled flag may indicate if quantization is uniform or non-uniform. If the first signaled flag indicates uniform, a value corresponding to a scalar may be signaled. If the first flag indicates quantization is non-uniform, an index value corresponding a lookup table mapping quantization indices to dequantized values may be signaled.

As described above, in some cases, a 2D OFM may correspond to a down-sampled component of video (e.g., luma) in both the spatial and temporal dimensions. It should be noted that, in this case, a 3D OFM may correspond to down-sampled video in both the spatial and temporal dimensions. For example, in the temporal dimension, a down sampling factor of 6, could include 6 pictures being down-sampled to a single 2D OFM or 60 picture being down sampled to 10 OFMs, which could be represent in three dimensions as 10×W×H. In some cases, a video sequence may include highly detailed objects with low motion (i.e., high spatial detail and low temporal detail, e.g., a still leafy tree in the background). In some cases, a video sequence may include low detailed objects with high motion (i.e., low spatial detail and low high detail, e.g., a low textured bouncing ball). Thus, in one example, according to the techniques herein, different quantizers may be used for a group(s) of dimensions. That is, for example, when quantizing a subset of dimensions has a larger impact on performance finer quantization may be preferred for the subset. Selected quantizers for each group may be signaled within the bitstream.

Further, it should be noted that a single RGB image may be considered a 3D data set (e.g., color component (C)× Width (W)×Height (H)) and discrete convolution performed on the image may generate a corresponding 3D output feature map, e.g., with spatial down-sampling. Further, RGB video may be considered to be a 4D data set, i.e., C×W× H×N, where N is the number of pictures. In a manner similar to that described above, the 4D RGB video may be spatially and/or temporal down-sampled. That is, a corresponding OFM may be 4D (e.g., down-sampling 60 pictures to 10 OFMs) or 3D (e.g., down-sampling 6 pictures to a single OFM). As described above, different quantizers may be used for a group(s) of dimensions. For example, the green component may be more detailed than the red and/or blue component and in such a case, it may be useful to have multiple quantizers based on the level of detail of each component. That is, according to the techniques herein, regardless of how a multi-dimensional data set is defined and/or organized, different quantizers may be used and signaled for different groups of dimensions.

As described above, in one example, quantization may include mapping an amplitude to a quantization index. As further described above, a quantized OFM may be entropy encoded. Table 7 illustrates an example of a lookup table mapping ranges of 8-bit amplitudes (0 . . . 255) to quantization indices.

TABLE 7

| Amplitude | Quantization Index | |
| --- | --- | --- |
| Range | $Bin_0$ | $Bin_1$ |
| 0 . . . 63 | 0 | 0 |
| 64 . . . 127 | 0 | 1 |
| 128 . . . 191 | 1 | 0 |
| 192 . . . 255 | 1 | 1 |

With respect to Table 7 and in general, in some cases, a high degree of amplitude variance between spatially adjacent regions may be less probable than a low degree of amplitude variance between spatially adjacent regions. For example, the luma value (i.e., brightness) of an image in a video sequence may not vary dramatically within a spatial and/or temporal region (i.e., from picture-to-picture). Based on this, referring to the example illustrated in Table 7, if a region is in the range of 0 . . . 63, it may be more probable that an adjacent region is in a range of one of 0 . . . 63, 64

. . . 124, or 128 . . . 191 rather than 192 . . . 255. In this manner, if a quantization index is 00 there may be a relatively low probability that the subsequent quantization index is 11. In this manner, according to the techniques herein, entropy encoding may include determining a Probability Mass Function (PMF) for quantization indices at each location within a OMF and subset of symbols (e.g., quantization indices or dequantized values within a region) that have been decoded previously may be used to determine the PMF for current location. In one example, according to the techniques herein, an entropy encoder may use an arithmetic coder that make use of the corresponding PMF when coding a symbol. It should be noted that as described above, entropy coding is a lossless process. That is, an entropy encoder and entropy decoder are synchronized so that the decoder reproduces the same sequence of symbols (e.g., quantization indices) that were coded by the encoder. In one example, according to the techniques herein, a lookup table may be used to determine the probability mass function of a current symbol. In one example, a look up table may be based on a value of a previous decoded symbol (or a PMF of a previously coded symbol). For example, in the example of Table 7, if a previous decoded symbol is 00, the PMF for the current symbol may be as follows: 00:0.375; 01:0.25; 10:0.25; 11:0.125. Further, in one example, according to the techniques herein, a lookup table may be based on a value of a previous decoded symbol (or a PMF of a previously coded symbol) and a context corresponding to a subset of previously coded decoded symbol. Table 8 illustrates an example where a previous coded symbol and a context provide a PMF for a current symbol.

In this manner, data decoder 124 represents an example of a device configured to entropy decode a quantized output data set according to a determined probability mass function.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any

TABLE 8

| Previous Coded Symbol | Context 1 (e.g., low variance in region) | Context 2 (e.g., high variance in region) |
|---|---|---|
| 00 | 00: 0.375; 01: 0.250; 10: 0.250; 11: 0.125 | 00: 0.300; 01: 0.275; 10: 0.275; 11: 0.150. |
| 01 | 00: 0.250; 01: 0.375; 10: 0.250; 11: 0.125 | 00: 0.275; 01: 0.300; 10: 0.275; 11: 0.150. |
| 10 | 00: 0.125; 01: 0.250; 10: 0.375; 11: 0.250 | 00: 0.150; 01: 0.275; 10: 0.300; 11: 0.275 |
| 11 | 00: 0.125; 01: 0.250; 10: 0.250; 11: 0.375 | 00: 0.150; 01: 0.275; 10: 0.275; 11: 0.300 |

As illustrated in Table 8, Context 1 corresponds to a low variance regions and Context 2 corresponds to a high variance region. As such, in Context 2 there is less confidence (i.e., lower probability) that a current symbol will be the same as the previous symbol. In some cases, Table 8 may be more complex (i.e., e.g., more than two contexts, contexts defined with linear and non-linear relationships, with one or more previously coded symbols). In one example, this relationship might be best represented by a combination of linear and non-linear operations.

In this manner, data encoder 106 represents an example of a device configured to generate an output data set corresponding to input data by performing a discrete convolution and generate a signal providing information corresponding to the output data set by quantizing the output data set on a subset-by-subset basis and providing information indicating information corresponding to a quantizer for each subset.

In this manner, data encoder 106 represents an example of a device configured to entropy encode a quantized output data set according to a determined probability mass function.

In this manner, data decoder 124 represents an example of a device configured to receive an output data set quantized on a subset-by-subset basis and generate an input data set corresponding to the output data by determining a quantizer for each subset.

connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of encoding video data, the method comprising:

receiving an input data set of video data;

generating an output data set, including output feature maps, by performing a discrete convolution on the input data set, wherein performing a discrete convolution on the input data set includes spatially down-sampling the input data set;

quantizing the output feature maps on a picture-by-picture basis, wherein quantizing the output feature maps on the picture-by-picture basis includes reducing a bit-depth of sample values in the output feature maps to a bit-depth which is the same as the input video data bit-depth by mapping ranges of amplitudes to quantization indices using different quantizers for each picture; and generating a bitstream by encoding the quantized output feature maps according to a video coding standard utilizing lossy video compression techniques.

2. A device comprising one or more processors configured to:

receive an input data set of video data;

generate an output data set, including output feature maps, by performing a discrete convolution on the input data set, wherein performing a discrete convolution on the input data set includes spatially down-sampling the input data set;

quantize the output feature maps on a picture-by-picture basis, wherein quantizing the output feature maps on the picture-by-picture basis includes reducing a bit-depth of sample values in the output feature maps to a bit-depth which is the same as the input video data bit-depth by mapping ranges of amplitudes to quantization indices using different quantizers for each picture; and generate a bitstream by encoding the quantized output feature maps according to a video coding standard utilizing lossy video compression techniques.

3. The device of claim 2, wherein the device includes a compression engine.

* * * * *